United States Patent
Matsumura et al.

(10) Patent No.: US 12,177,158 B2
(45) Date of Patent: Dec. 24, 2024

(54) USER TERMINAL AND RADIO COMMUNICATION METHOD

(71) Applicant: NTT DOCOMO, INC., Tokyo (JP)

(72) Inventors: Yuki Matsumura, Tokyo (JP); Kazuki Takeda, Tokyo (JP); Satoshi Nagata, Tokyo (JP)

(73) Assignee: NTT DOCOMO, INC., Tokyo (JP)

(*) Notice: Subject to any disclaimer, the term of this patent is extended or adjusted under 35 U.S.C. 154(b) by 360 days.

(21) Appl. No.: 17/430,475

(22) PCT Filed: Feb. 14, 2019

(86) PCT No.: PCT/JP2019/005424
§ 371 (c)(1),
(2) Date: Aug. 12, 2021

(87) PCT Pub. No.: WO2020/166024
PCT Pub. Date: Aug. 20, 2020

(65) Prior Publication Data
US 2022/0353046 A1    Nov. 3, 2022

(51) Int. Cl.
*H04L 5/00* (2006.01)
*H04W 72/044* (2023.01)
*H04W 72/231* (2023.01)

(52) U.S. Cl.
CPC .......... *H04L 5/0055* (2013.01); *H04L 5/0094* (2013.01); *H04W 72/046* (2013.01); *H04W 72/231* (2023.01)

(58) Field of Classification Search
CPC .................................................... H04L 5/0055
See application file for complete search history.

(56) References Cited

U.S. PATENT DOCUMENTS

| 2020/0092068 A1 | 3/2020 | Yang et al. |
| 2020/0205149 A1* | 6/2020 | Khoshnevisan ...... H04L 1/1854 |
| 2020/0205150 A1* | 6/2020 | Cheng ................... H04W 72/21 |

(Continued)

FOREIGN PATENT DOCUMENTS

WO    2020/061171 A1    3/2020

OTHER PUBLICATIONS

Extended European Search Report issued in counterpart European Patent Application No. 19915398.2, mailed on Aug. 24, 2022 (7 pages).

(Continued)

*Primary Examiner* — Jason E Mattis
(74) *Attorney, Agent, or Firm* — Osha Bergman Watanabe & Burton LLP

(57) ABSTRACT

A user terminal according to an aspect of the present disclosure includes a receiving section that receives a first PDSCH (Physical Downlink Shared Channel) from a first transmission/reception point (TRP), and a second PDSCH from a second TRP, the second PDSCH overlapping the first PDSCH in at least one of time and frequency resources, and a control section that performs control for transmitting a first Hybrid Automatic Repeat reQuest ACKnowledgement (HARQ-ACK) for the first PDSCH to the first TRP, and transmitting a second HARQ-ACK for the second PDSCH to the second TRP. According to an aspect of the present disclosure, the HARQ-ACK control can be preferably implemented even in the case of using the multi-TRP.

5 Claims, 19 Drawing Sheets

(56) References Cited

U.S. PATENT DOCUMENTS

| | | | |
|---|---|---|---|
| 2021/0314107 A1* | 10/2021 | Yoshioka | H04L 1/1819 |
| 2021/0336664 A1* | 10/2021 | Yang | H04B 7/0689 |
| 2022/0022237 A1* | 1/2022 | Kim | H04L 5/0053 |

OTHER PUBLICATIONS

Office Action issued in the counterpart Chinese Application No. 201980094540.1, mailed Jun. 13, 2023 (12 pages).

International Search Report issued in PCT/JP2019/005424 on Apr. 9, 2019 (1 page).

Written Opinion of the International Searching Authority issued in PCT/JP2019/005424 on Apr. 9, 2019 (4 pages).

Qualcomm Incorporated; "Multi-TRP Enhancements"; 3GPP TSG-RAN WG1 Meeting AH-1901, R1-1900905; Taipei, Taiwan; Jan. 21-25, 2019 (28 pages).

CATT; "Consideration on multi-TRP/panel transmission"; 3GPP TSG RAN WG1 Ad-Hoc Meeting 1901, R1-1901296; Taipei; Jan. 21-25, 2019 (14 pages).

Huawei, HiSilicon; "Enhancements on multi-TRP/panel transmission"; 3GPP TSG RAN WG1 Ad-Hoc Meeting 1901, R1-1900017; Taipei; Jan. 21-25, 2019 (15 pages).

3GPP TS 36.300 V8.12.0; "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in the counterpart Japanese Application No. 2020-572006, mailed Feb. 28, 2023 (6 pages).

Office Action issued in Japanese Application No. 2023-169261, dated Jul. 30, 2024 (6 pages).

3GPP TSG RAN WG1 Ad-Hoc Meeting 1901; R1-1901133; CAICT; "Discussion on URLLC reliability/robustness enhancement with multi-TRP/panel"; Taipei, Jan. 21-25, 2019 (4 pages).

\* cited by examiner

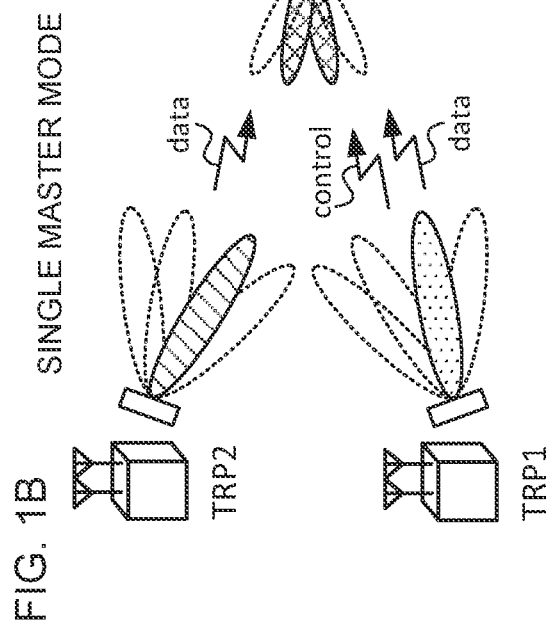
FIG. 1A SINGLE MODE
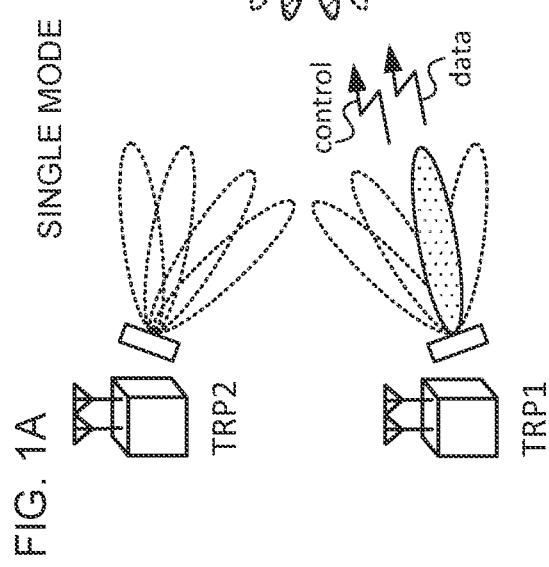
FIG. 1B SINGLE MASTER MODE
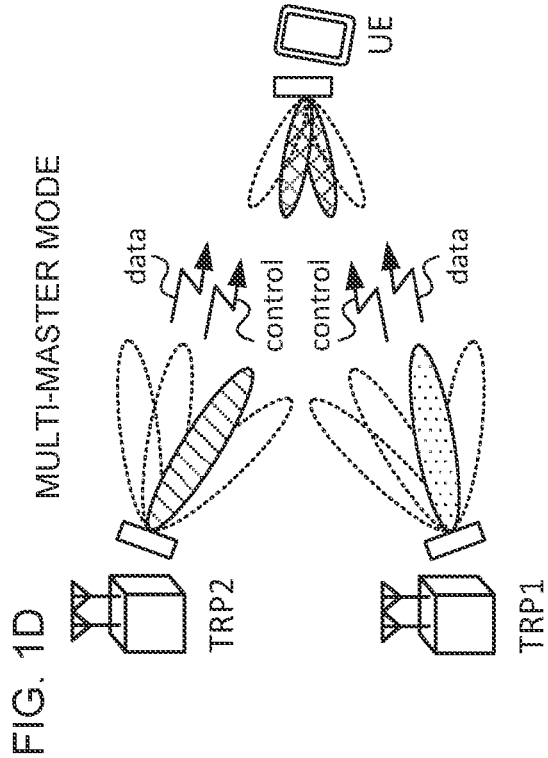
FIG. 1C MASTER SLAVE MODE
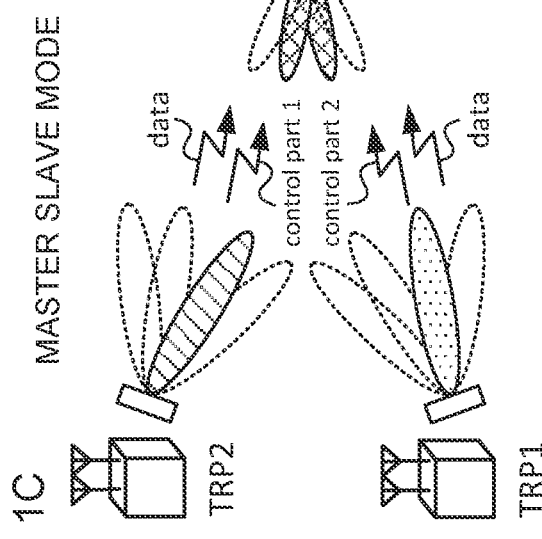
FIG. 1D MULTI-MASTER MODE

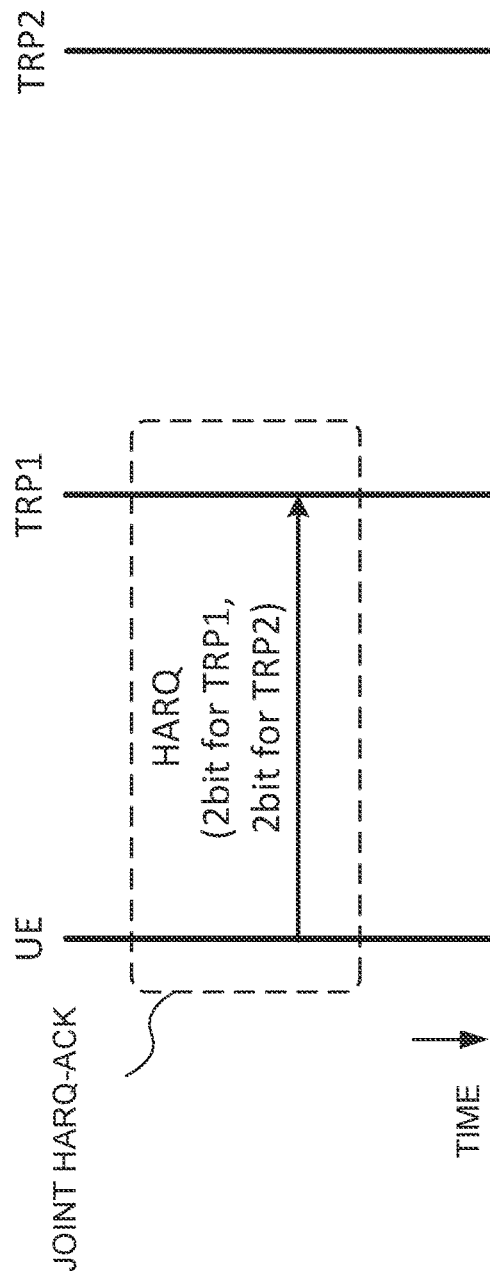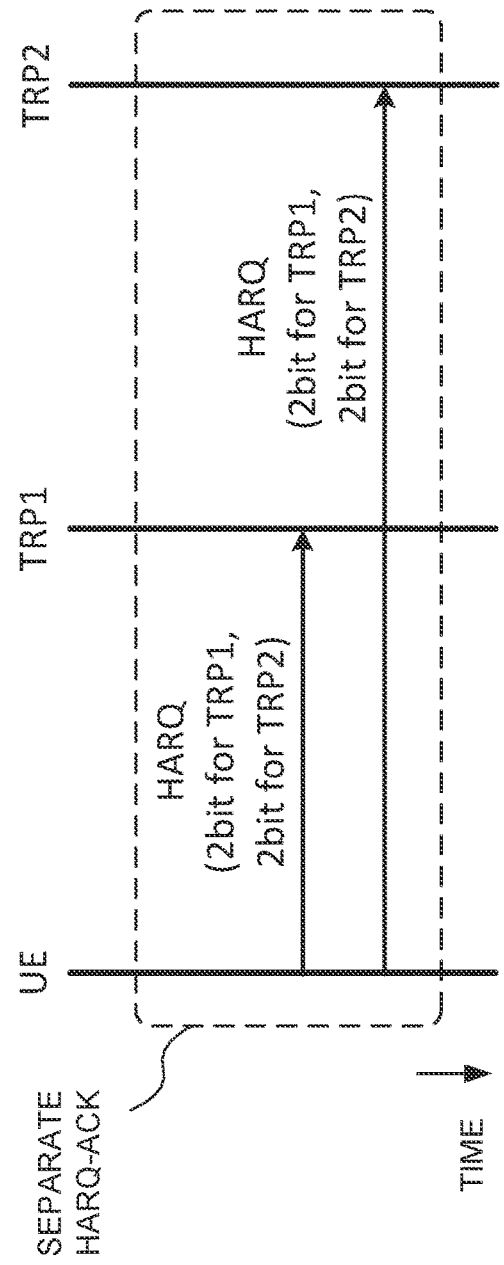

USER TERMINAL AND RADIO COMMUNICATION METHOD

TECHNICAL FIELD

The present disclosure relates to a user terminal and a radio communication method in next-generation mobile communication systems.

BACKGROUND ART

In Universal Mobile Telecommunications System (UMTS) networks, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

For future radio communication systems (for example, NR), one or more transmission/reception points (TRPs) (multi-TRP) performing DL transmission to a user terminal (User Equipment (UE)) is under study.

However, in the previous NR specifications, since the multi-TRP is not taken into account, Hybrid Automatic Repeat reQuest ACKnowledgement (HARQ-ACK) feedback in a case that the multi-TRP is used cannot be appropriately controlled. Accordingly, in a case of complying with the current NR specifications, a spatial diversity gain, a high rank transmission, and the like in the case of using the multi-TRP cannot be preferably achieved, and communication throughput increase is likely to be suppressed.

Then, an object of the present disclosure is to provide a user terminal and a radio communication method capable of appropriately implementing the HARQ-ACK control even in the case of using the multi-TRP.

Solution to Problem

A user terminal according to an aspect of the present disclosure includes a receiving section that receives a first PDSCH (Physical Downlink Shared Channel) from a first transmission/reception point (TRP), and a second PDSCH from a second TRP, the second PDSCH overlapping the first PDSCH in at least one of time and frequency resources, and a control section that performs control for transmitting a first Hybrid Automatic Repeat reQuest ACKnowledgement (HARQ-ACK) for the first PDSCH to the first TRP, and transmitting a second HARQ-ACK for the second PDSCH to the second TRP.

Advantageous Effects of Invention

According to an aspect of the present disclosure, the HARQ-ACK control can be preferably implemented even in the case of using the multi-TRP.

BRIEF DESCRIPTION OF DRAWINGS

FIGS. 1A to 1D are diagrams to show examples of a multi-TRP scenario;

FIGS. 14A and 14B are diagrams to show examples of a semi-static HARQ codebook;

DESCRIPTION OF EMBODIMENTS (Multi-TRP)

Figure 2:
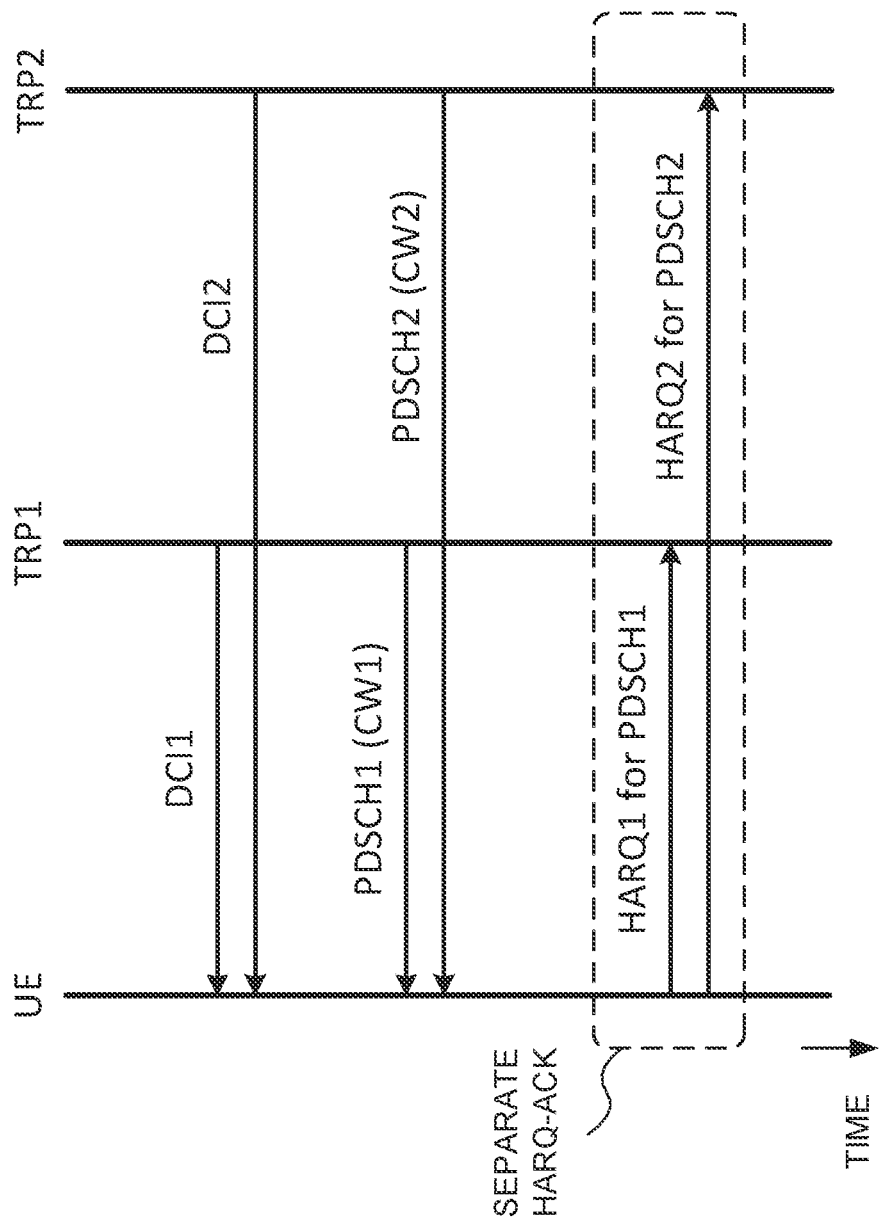
FIG. 2 is a diagram to show an example of a flow of a separate HARQ-ACK.

For NR, one or more transmission/reception points (TRPs) (multi-TRP) performing a DL transmission (for example, PDSCH transmission) to a UE by use of one or more panels (multi-panel) is under study.

FIGS. 1A to 1D are diagrams to show examples of a multi-TRP scenario. In these examples, assume that each TRP can transmit four different beams, but the embodiments are not limited to these examples.

FIG. 1A shows an example of a case that only one TRP (TRP 1 in this example) in the multi-TRP performs transmission to the UE (which may be referred to as a single mode). In this case, the TRP 1 transmits both a control signal (PDCCH) and a data signal (PDSCH) to the UE.

FIG. 1B shows an example of a case that only one TRP (TRP 1 in this example) in the multi-TRP transmits a control signal to the UE, and the multi-TRP transmits a data signal (which may be referred to as a single master mode). The UE receives each PDSCH transmitted from the multi-TRP based on one piece of downlink control information (DCI).

FIG. 1C shows an example of a case that each in the multi-TRP transmits a part of a control signal to the UE, the multi-TRP transmits a data signal (which may be referred to as a master slave mode). The TRP 1 may transmit a part 1 of the control signal (DCI), and the TRP 2 may transmit a part 2 of the control signal (DCI). The part 2 of the control signal may depend on the part 1. The UE receives each PDSCH transmitted from the multi-TRP, based on these parts of the DCI.

FIG. 1D shows a case that each in the multi-TRP transmits a different control signal to the UE, and the multi-TRP transmits a data signal (which may be referred to as a multi-master mode). The TRP 1 may transmit a first control signal (DCI), and the TRP 2 may transmit a second control signal (DCI). The UE receives each PDSCH transmitted from the multi-TRP, based on these pieces of DCI.

In a case of scheduling a plurality of PDSCHs from the multi-TRP as shown in FIG. 1B by use of one piece of DCI, the DCI may be referred to as single-DCI (single-PDCCH). In a case of scheduling respectively a plurality of PDSCHs from the multi-TRP as shown in FIG. 1D by use of a plurality of pieces of DCI, the plurality of pieces of DCI may be referred to as multi-DCI (multi-PDCCH).

According to such multi-TRP scenarios, more flexible transmission control using a high quality channel can be performed.

Different codewords (Code Word, CW) and different layers may be transmitted from respective TRPs in the multi-TRP. Non-coherent joint transmission (NCJT) is under study as one form of the multi-TRP transmission).

In the NCJT, for example, the TRP 1 modulation-maps a first codeword, and performs layer mapping to transmit a first PDSCH by use of a first precoding of a first number of layers (for example, two layers). The TRP 2 modulation-maps a second codeword, and performs layer mapping to transmit a second PDSCH by use of a second precoding of a second number of layers (for example, two layers). These first and second PDSCHs may be assumed to be not in a quasi-co-location relationship (not quasi-co-located with each other).

Note that a plurality of PDSCHs subjected to the NCJT may be defined to partially or completely overlap for at least one of time and frequency domains.

Here, in the previous NR specifications, since the multi-TRP is not taken into account, Hybrid Automatic Repeat reQuest ACKnowledgement (HARQ-ACK) feedback in a case that the multi-TRP is used cannot be appropriately controlled. Accordingly, in a case of complying with the current NR specifications, a spatial diversity gain, a high rank transmission, and the like in the case of using the multi-TRP cannot be preferably achieved, and communication throughput increase is likely to be suppressed.

Accordingly, the inventors of the present invention came up with the idea of HARQ-ACK control capable of supporting the case of using the multi-TRP.

The present disclosure provides a method for determining an uplink control channel (Physical Uplink Control Channel (PUCCH))/uplink shared channel (Physical Uplink Shared Channel (PUSCH)) resource for transmitting the HARQ-ACK for the multi-PDSCH scheduled by the PDCCH (for example, a plurality of PDSCHs subjected to the NCJT), with respect to at least one of the single-PDCCH and the multi-PDCCH, for example. Note that the PUCCH/PUSCH may refer to at least one of the PUCCH and the PUSCH (hereinafter, the same is applied).

An embodiment proposes to transmit an HARQ-ACK on a different PUCCH/PUSCH resource for each TRP. Such a transmission form of HARQ-ACK feedback may be referred to as separate HARQ-ACK feedback (transmission), individual HARQ-ACK feedback, or the like.

Use of the separate HARQ-ACK enables the HARQ-ACK transmission independent for each TRP. Even in a case that a backhaul delay between the TRPs is large (for example, the TRPs are connected via a non ideal backhaul), an HARQ delay is not large.

An embodiment proposes to transmit an HARQ-ACK for each TRP on the same PUCCH/PUSCH resource. Such a transmission form of HARQ-ACK feedback may be referred to as joint HARQ-ACK feedback (transmission), collaborative HARQ-ACK feedback, or the like.

Use of the joint HARQ-ACK enables one PUCCH/PUSCH transmission to suffice, reducing resource overhead. In a case that the backhaul delay between the TRPs is small (for example, the TRPs are connected via an ideal backhaul, the HARQ-ACK transmitted to one TRP can be delivered to the other TRP with low delay.

Hereinafter, embodiments according to the present disclosure will be described in detail with reference to the drawings. The radio communication method according to each embodiment may be employed independently or may be employed in combination.

Note that in the present disclosure, a panel, an Uplink (UL) transmission entity, a TRP, a demodulation reference signal (DMRS) port, a DMRS port group, a code division multiplexing (CDM) group, a PDSCH, codeword, a base station, and the like may be interchangeably interpreted. A panel Identifier (ID) and a panel may be interchangeably interpreted. A TRP ID and a TRP may be interchangeably interpreted. An ID and an index may be interchangeably interpreted.

An HARQ-ACK in the following embodiment may be interpreted as uplink control information (UCI). Specifically, an HARQ-ACK may be interchangeably interpreted as any one or a combination of an HARQ-ACK, channel state information (CSI), a scheduling request (SR), and the like.

In the present disclosure, a NCJT, a NCJT using a multi-TRP, a multi-PDSCH using a NCJT, a multi-PDSCH, a plurality of PDSCHs from a multi-TRP, and the like may be interchangeably interpreted.

(Radio Communication Method)

First Embodiment

A first embodiment relates to the separate HARQ-ACK transmission. Each HARQ-ACK corresponding to the separate HARQ-ACK may correspond to a different PDSCH (CW) and may be transmitted using at least one of the PUCCH and the PUSCH. The UE transmits the separate HARQ-ACK to the respective different TRPs.

A plurality of PDSCHs (multi-PDSCH) corresponding to the separate HARQ-ACK may be transmitted from the respective TRPs simultaneously, or at different timings. These PDSCHs may be scheduled by use of the single-PDCCH or the multi-PDCCH.

FIG. 2 a diagram to show an example of a flow of the separate HARQ-ACK. In this example, the UE receives DCI 1 and DCI 2 each constituting the multi-PDCCH from the TRPs 1 and 2, respectively. The UE receives a PDSCH 1 (CW1) transmitted from TRP 1 based on the DCI 1, and a PDSCH 2 (CW2) transmitted from the TRP 2 based on the DCI 2.

The UE transmits an HARQ-ACK 1 (HARQ 1, hereinafter, an HARQ-ACK may be simply referred to as an HARQ) for the PDSCH 1 to the TRP 1, and transmits an HARQ-ACK 2 (HARQ 2) for the PDSCH 2 to the TRP 2.

Note that this example is described assuming that the TRP transmitting the DCI, the TRP transmitting the PDSCH scheduled by way of the DCI, and the TRP receiving the HARQ-ACK for the PDSCH are the same, but at least one of these TRPs may correspond to a different TRP. This also applies to the following examples.

Figure 3A:
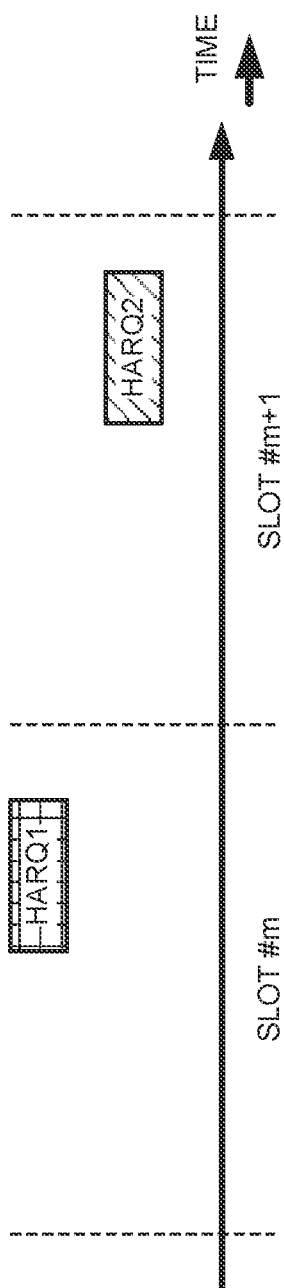
FIGS. 3A and 3B are diagrams to show examples of a transmission timing of the separate HARQ-ACK.
Figure 3B:
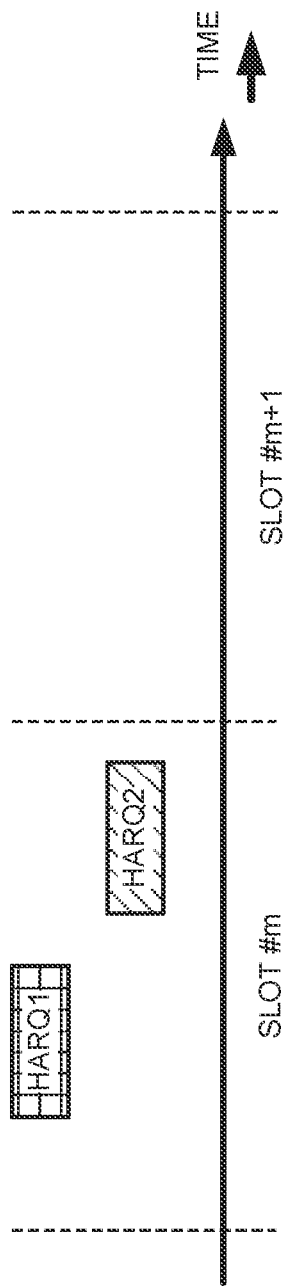

FIGS. 3A and 3B are diagrams to show examples of a transmission timing of the separate HARQ-ACK. The separate HARQ-ACK may be transmitted in different slots (that is, one PUCCH/PUSCH is used for each slot) (FIG. 3A), or may be transmitted in one slot (that is, a plurality of PUCCHs/PUSCHs are used for each slot) (FIG. 3B).

In FIG. 3A, the HARQ 1 and the HARQ 2 constituting the separate HARQ-ACK are transmitted in different slots #m and #m+1 by the UE. Similar HARQ 1 and HARQ 2 are transmitted in the same slot #m by the UE. Note that in the case that the separate HARQ-ACK is transmitted in different slots, these slots may not be continuous.

[One PUCCH/PUSCH for Each Slot]

The UE may be notified (configured, indicated) to transmit the separate HARQ-ACK using one PUCCH/PUSCH for each slot through higher layer signaling, physical layer signaling (for example, DCI scheduling at least one of the multi-PDSCH), or a combination of these.

Note that, in the present disclosure, the higher layer signaling may be, for example, any one or a combination of Radio Resource Control (RRC) signaling, Medium Access Control (MAC) signaling, broadcast information, and the like.

For example, the MAC signaling may use MAC control elements (MAC CE), MAC Protocol Data Units (PDUs), and the like. The broadcast information may be, for example, master information block (MIB), system information block (SIB), minimum system information (remaining minimum system information (RMSI)), other system information (OSI), and the like.

The physical layer signaling may be DCI, for example.

The UE, in the case of transmitting the separate HARQ-ACK using one PUCCH/PUSCH for each slot, may transmit each HARQ-ACK using a PUCCH/PUSCH resource complying with Rel-15 NR.

In Rel-15 NR, the UE first determines one from four PUCCH resource sets (PUCCH resource sets 1 to 4) depending on a size of the UCI to be transmitted. In a case that the UCI includes an HARQ-ACK, the UE identifies the PUCCH resource for transmitting the UCI, based on a PUCCH resource indicator field included in DCI format 1_0 or 1_1 that specifies a transmission timing of the HARQ-ACK (and at least one of a Control Channel Element (CCE) index of a CORESET receiving the DCI, the number of CCEs, and the like).

Note that in a case that a plurality of DCI formats 1_0 or 1_1 specify the transmission timing of the HARQ-ACK in the same slot, the UE may identify the PUCCH resource based on the PUCCH resource indicator field in last DCI format 1_0 or 1_1 of these DCI. Note that "last DCI format 1_0 or 1_1" referred to here may mean last DCI format 1_0 or 1_1 of which index is obtained by indexing in ascending order of a serving cell index in the same PDCCH monitoring occasion, and then, indexing in ascending order of a PDCCH monitoring occasion index, or DCI format 10 or 11 received the last in terms of time.

The network may restrict the UE to the transmission of the separate HARQ-ACK using one PUCCH/PUSCH for each slot. For example, regarding the HARQ-ACK transmission for a plurality of CWs (PDSCHs) for the NCJT multi-TRP or the multi-panel, the UE may not expect that the plurality of CWs are configured for the same slot index.

In a case that the UE is configured to transmit the separate HARQ-ACK using one PUCCH/PUSCH for each slot, and configured to transmit more than one HARQ-ACK for a plurality of CWs (PDSCHs) for the NCJT multi-TRP in one slot, the UE may determine to transmit (or drop) any of the following HARQ-ACKs:

(1) HARQ-ACK corresponding to a TRP ID of a specific value (for example, minimum, maximum),
(2) HARQ-ACK corresponding to a TRP ID the same as for the single port transmission,
(3) HARQ-ACK in a case that a QCL assumption (or QCL assumption for corresponding PDSCH) is the same as a specific QCL assumption for PDCCH.

Here, (3) a specific QCL assumption for PDCCH described above may be a default QCL assumption for PDCCH, or a QCL assumption for a search space (or search space set) for the latest slot of a minimum CORESET-ID, for example.

[Plurality of PUCCHs/PUSCHs for Each Slot]

The UE may be notified (configured, indicated) to transmit the separate HARQ-ACK using a plurality of PUCCHs/PUSCHs for each slot through higher layer signaling, physical layer signaling (for example, DCI scheduling at least one of the multi-PDSCH), or a combination of these.

The UE may be configured with a PUCCH resource set for each TRP through higher layer signaling, for example. According to this structure, a flexible resource usage is enabled.

One or more PUCCH resource sets for one TRP may be referred to as a group of PUCCH resource sets for the TRP. The group may be configured for the UE by use of, for example, a TRP ID (or a group ID), a PUCCH resource set ID, and the like.

Figure 4:
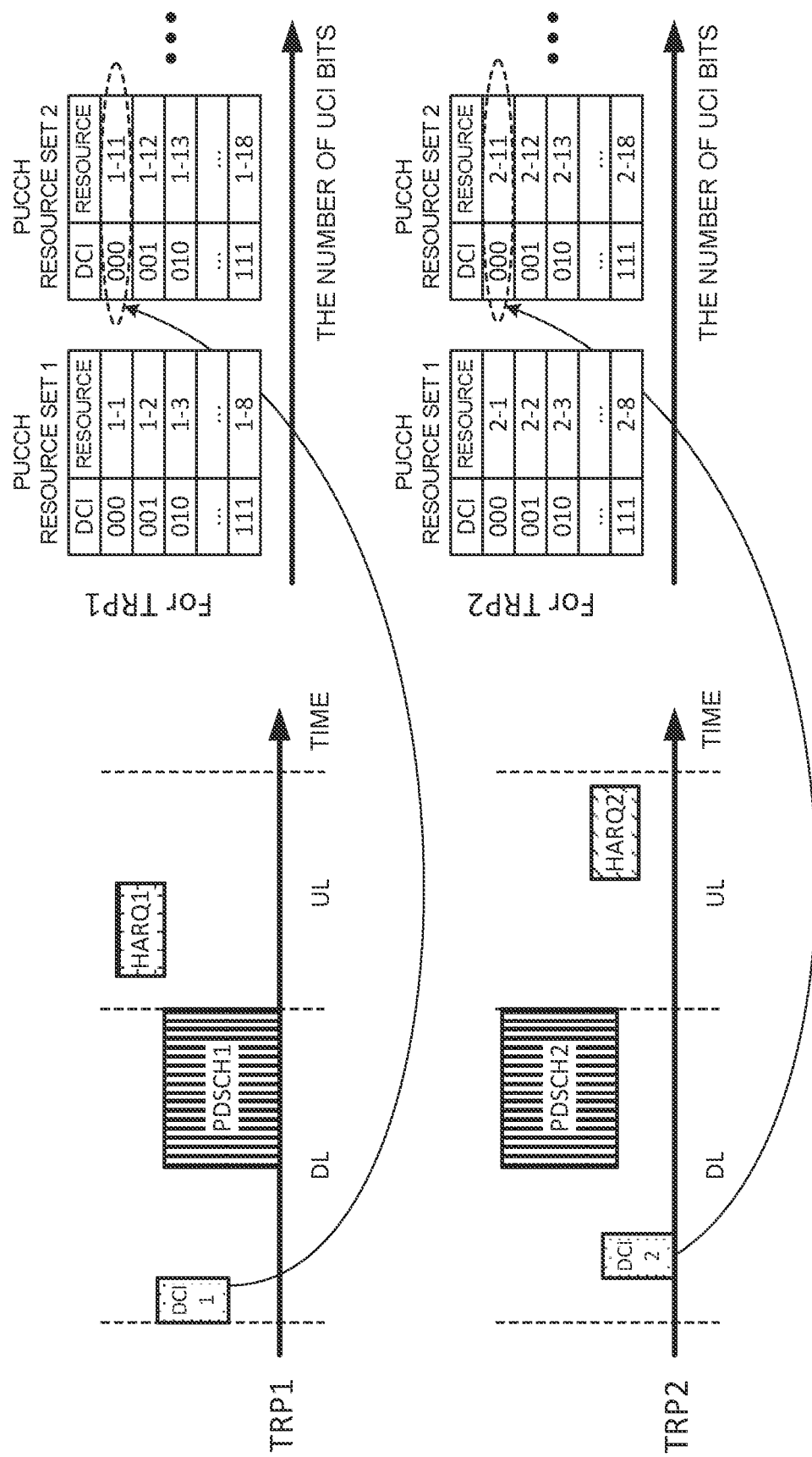
FIG. 4 is a diagram to show an example in which a plurality of groups of PUCCH resource sets are configured.

FIG. 4 is a diagram to show an example in which a plurality of groups of PUCCH resource sets are configured. In this example, the UE is configured with a group of PUCCH resource sets including PUCCH resource sets 1, 2, . . . for each TRP. Note that the maximum number of PUCCH resource sets may be four as in the related art, or a value different from four.

Note that in the present disclosure, a PUCCH resource set i may be defined such that the larger a size of UCI bits, the larger i is used, but the PUCCH resource set i is not limited to this. An example is shown in which the number of PUCCH resources included in one PUCCH resource set is eight, but the number of PUCCH resources is not limited to this.

In examples described below show, an example is shown in which the HARQ-ACK transmission is performed using a PUCCH resource in a certain PUCCH resource set 2 (that is, the PUCCH resource set 2 is selected based on the UCI size), but present disclosure is not limited to this.

As shown on an upper right side in FIG. 4, in the PUCCH resource set 1 for the TRP 1, PUCCH resources 1-1 to 1-8 are configured correspondingly to DCI=000 to 111. In the PUCCH resource set 2 for the TRP 1, PUCCH resources 1-11 to 1-18 are configured correspondingly to DCI (more specifically, PUCCH resource indicator field. The same is applied to the following drawings)=000 to 111.

As shown on a lower right side in FIG. 4, in the PUCCH resource set 1 for the TRP 2, PUCCH resources 2-1 to 2-8 are configured correspondingly to DCI=000 to 111. In the PUCCH resource set 2 for the TRP 2, PUCCH resources 2-11 to 2-18 are configured correspondingly to DCI=000 to 111.

As shown on an upper left side in FIG. 4, the UE receives the DCI 1 indicating the PDSCH 1 for the TRP 1 (DMRS port group 1), and transmits the HARQ 1 corresponding to the PDSCH 1. Here, a PUCCH resource for the HARQ 1 may be specified in a certain field of the DCI 1 (for example, a PUCCH resource indicator field). For example, in a case that the certain field of the DCI 1 is "000", the UE may use the resource 1-11 to transmit the HARQ 1, based on an upper right table in FIG. 4. Hereinafter, a certain field of the DCI may be interpreted as a PUCCH resource indicator field.

As shown on a lower left side in FIG. 4, the UE receives the DCI 2 indicating the PDSCH 2 for the TRP 2 (DMRS port group 2), and transmits the HARQ 2 corresponding to the PDSCH 2. Here, a PUCCH resource for the HARQ 2 may be specified in a certain field of the DCI 2 (for example, a PUCCH resource indicator field). For example, in a case that the certain field of the DCI 2 is "000", the UE may use the resource 2-11 to transmit the HARQ 2, based on a lower right table in FIG. 4.

The UE may be configured with a group of PUCCH resource sets common to the TRPs (which may be also referred to as PUCCH resource sets independent from the TRP). According to this structure, an amount of information for configuring the PUCCH resource sets can be prevented from increasing. Note that the group of PUCCH resource sets common to the TRPs may correspond to PUCCH resource sets 1 to 4 defined in Rel-15 NR.

Figure 5:
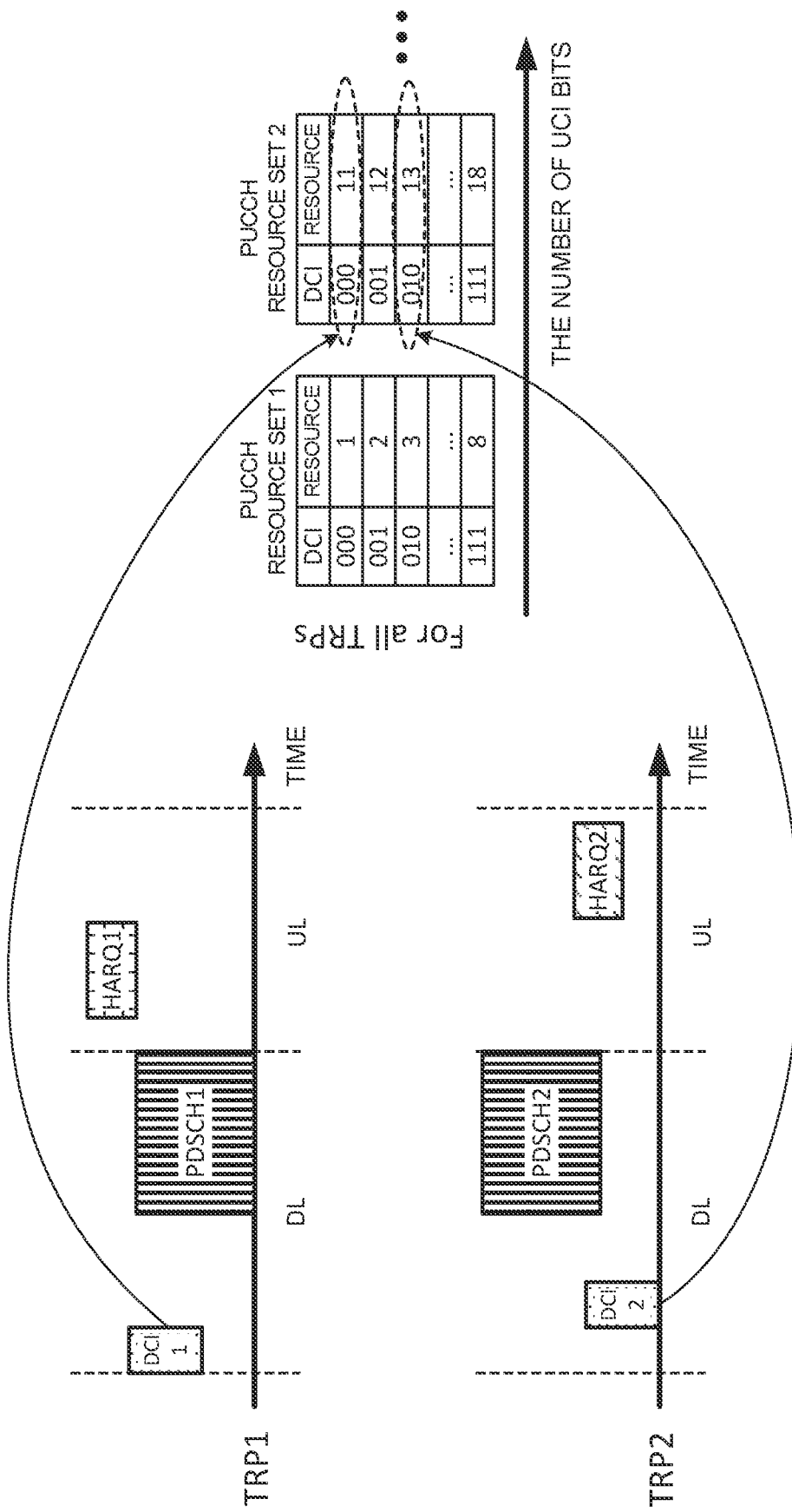
FIG. 5 is a diagram to show an example in which a group of PUCCH resource sets common to TRPs is configured.

FIG. 5 is a diagram to show an example in which a group of PUCCH resource sets common to TRPs is configured. In this example, the UE is configured with a group of PUCCH resource sets including PUCCH resource sets 1, 2, . . . common to the TRPs (without distinguishing the TRPs).

As shown on a right side in FIG. 5, in the PUCCH resource set 1, PUCCH resources 1 to 8 are configured correspondingly to DCI=000 to 111. In the PUCCH resource set 2, PUCCH resources 11 to 18 are configured correspondingly to DCI=000 to 111.

As shown on an upper left side in FIG. 5, the UE receives the DCI 1 indicating the PDSCH for the TRP 1 (DMRS port group 1), and transmits the HARQ 1 corresponding to the PDSCH. Here, a PUCCH resource for the HARQ 1 may be specified in a certain field of the DCI 1 (for example, a PUCCH resource indicator field). For example, in a case that the certain field of the DCI 1 is "000", the UE may use the resource 11 to transmit the HARQ 1, based on a right table in FIG. 5.

As shown on a lower left side in FIG. 5, the UE receives the DCI 2 indicating the PDSCH for the TRP 2 (DMRS port group 2), and transmits the HARQ 2 corresponding to the PDSCH. Here, a PUCCH resource for the HARQ 2 may be specified in a certain field of the DCI 2 (for example, a PUCCH resource indicator field). For example, in a case that the certain field of the DCI 2 is "010", the UE may use the resource 13 to transmit the HARQ 2, based on the right table in FIG. 5.

Note that in a case that a plurality of pieces of DCI are received at a TRP, a PUCCH resource for the TRP may be determined by the same method as in Rel-15 NR described above (for example, by selecting the last DCI a the TRP).

[Variation for Plurality of PUCCHs/PUSCHs for Each Slot]

Even in a case that a multi-TRP transmission (NCJT) is configured, the UE instantaneously receiving a PDSCH corresponding to a single-TRP transmission may use a PUCCH resource based on a PUCCH resource determination rule in Rel. 15 NR to transmit the HARQ-ACK corresponding to the PDSCH.

For example, in a case that the UE is scheduled with a plurality of PDSCHs partially or completely overlapping for at least one of time and frequency domains by way of more than one piece of DCI, and at least one of the following conditions is satisfied, the PUCCH resources for the HARQ-ACK corresponding to the plurality of PDSCHs may be determined similarly to Rel. 15:

Only one DMRS port group for the plurality of PDSCHs is indicated,

Transmission Configuration Indication states (TCI states) for the plurality of PDSCHs are the same, or the plurality of PDSCHs correspond to a specific QCL relation (for example, QCL type D (QCL-D)).

Note that this case is not the separate HARQ-ACK transmission substantially. The UE may include HARQ-ACK for a plurality of PDSCHs for each TRP in one PUCCH/PUSCH to be transmitted.

Figure 6:
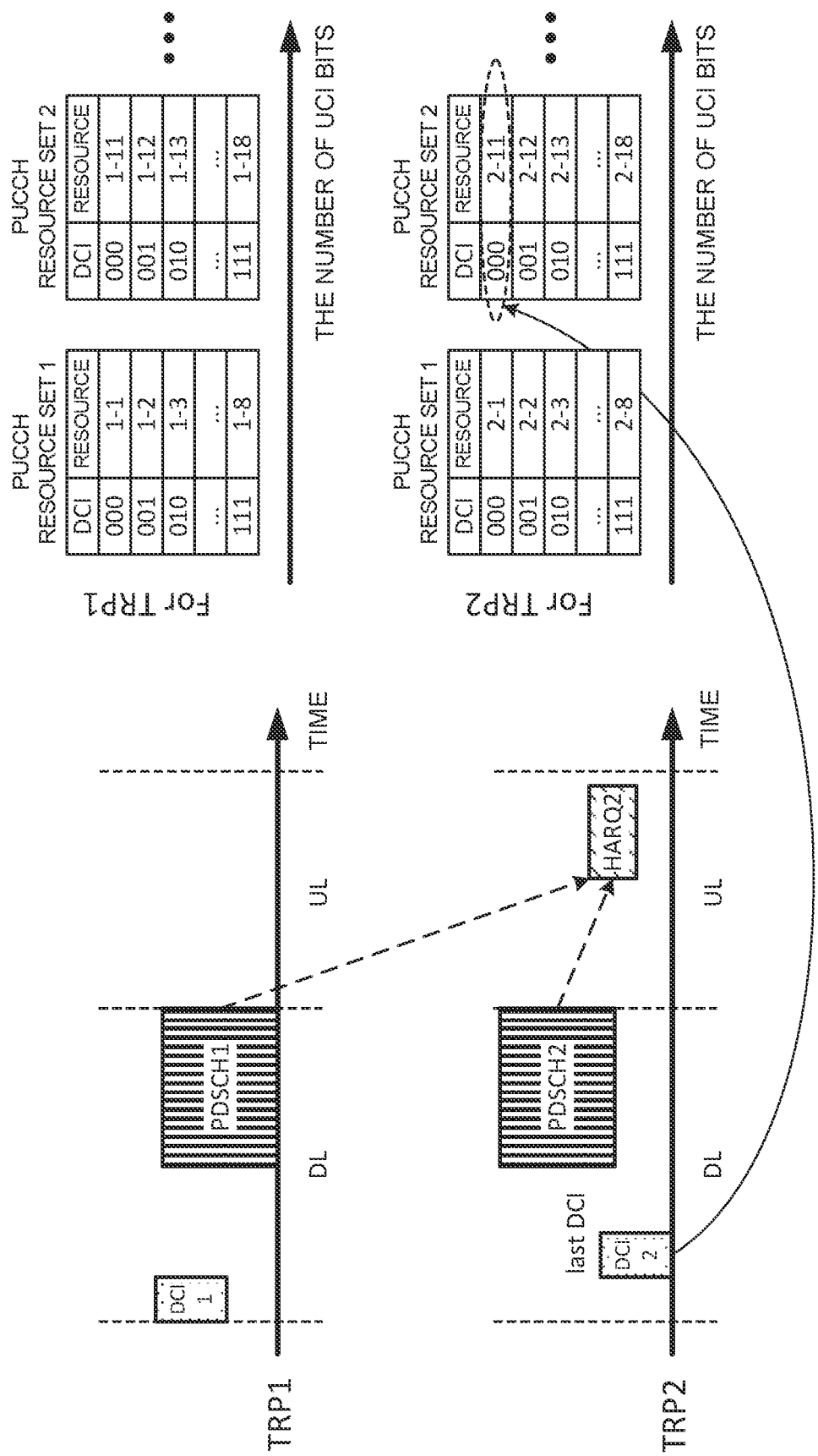
FIG. 6 is a diagram to show an example in which a plurality of groups of PUCCH resource sets are configured.

FIG. 6 is a diagram to show an example in which a plurality of groups of PUCCH resource sets are configured. This example is similar to that in FIG. 4, and thus, similar contents are not described repeatedly. In this example, the TCI states of the PDSCHs 1 and 2 are the same, and the UE may assume that these are transmitted substantially from the single-TRP.

In this case, the PUCCH resource may be determined by the same method as in Rel-15 NR described above (for example, by selecting the last DCI of the DCI 1 and DCI 2). In this example, the UE may select the DCI 2 as the DCI for determining the PUCCH resource, and transmit the HARQ 2 (and the HARQ 1) using the resource 2-11 based on a certain field of the DCI 2 (=000) and a lower right table in FIG. 6 (a table corresponding to the TRP 2).

Note that in case that at least one of the above conditions is satisfied, the PUCCH resources for the HARQ-ACK corresponding to the plurality of PDSCHs may be determined based on a group having the minimum group ID (or TRP ID) of the configured groups of PUCCH resource sets.

Figure 7:
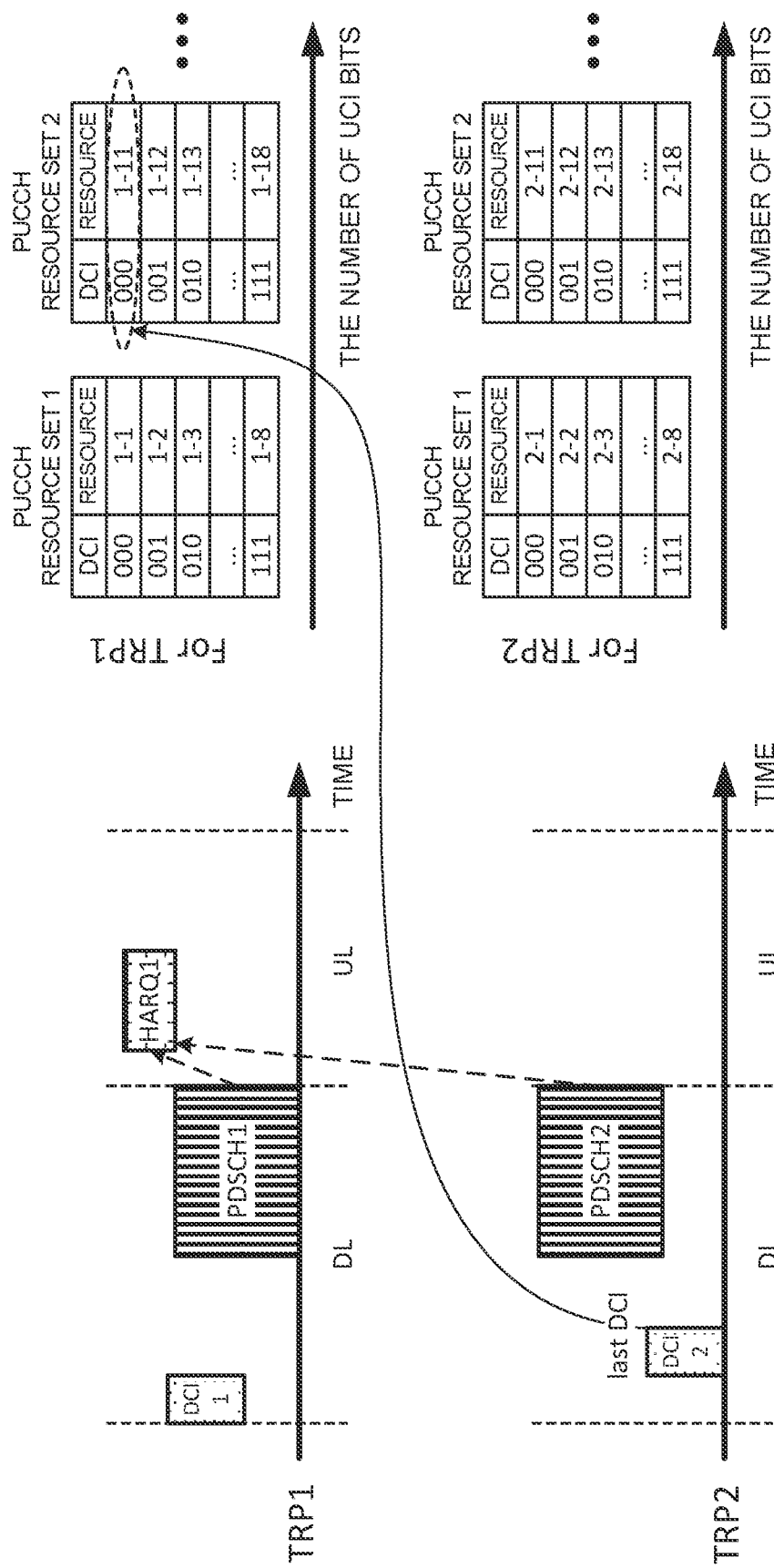
FIG. 7 is a diagram to show an example in which a plurality of groups of PUCCH resource sets are configured.

FIG. 7 is a diagram to show an example in which a plurality of groups of PUCCH resource sets are configured. This example is similar to that in FIG. 6, and thus, similar contents are not described repeatedly. In this example, the DCI 2 is selected as the DCI for determining the PUCCH resource, which is the same as in FIG. 6. A difference from FIG. 6 is that the PUCCH resource is determined from the resource for the TRP 1 corresponding to the minimum group ID. The UE may transmit the HARQ 1 (and the HARQ 2) using the resource 1-11 based on a certain field of the DCI 2 (=000) and an upper right table in FIG. 7 (a table corresponding to the TRP 1).

The UE may be configured with the group of PUCCH resource sets for each TRP in addition to the group of PUCCH resource sets in Rel. 15 (the group of PUCCH resource sets not associated with the TRP). In this case, the UE may determine the PUCCH resource transmitting the separate HARQ-ACK for a plurality of PDSCHs subjected to the NCJT, based on the group of PUCCH resource sets for each TRP.

On the other hand, the UE may determine the PUCCH resource transmitting the HARQ-ACK for a plurality of PDSCHs not subjected to the NCJT, based on the group of PUCCH resource sets not associated with the TRP.

Figure 8:
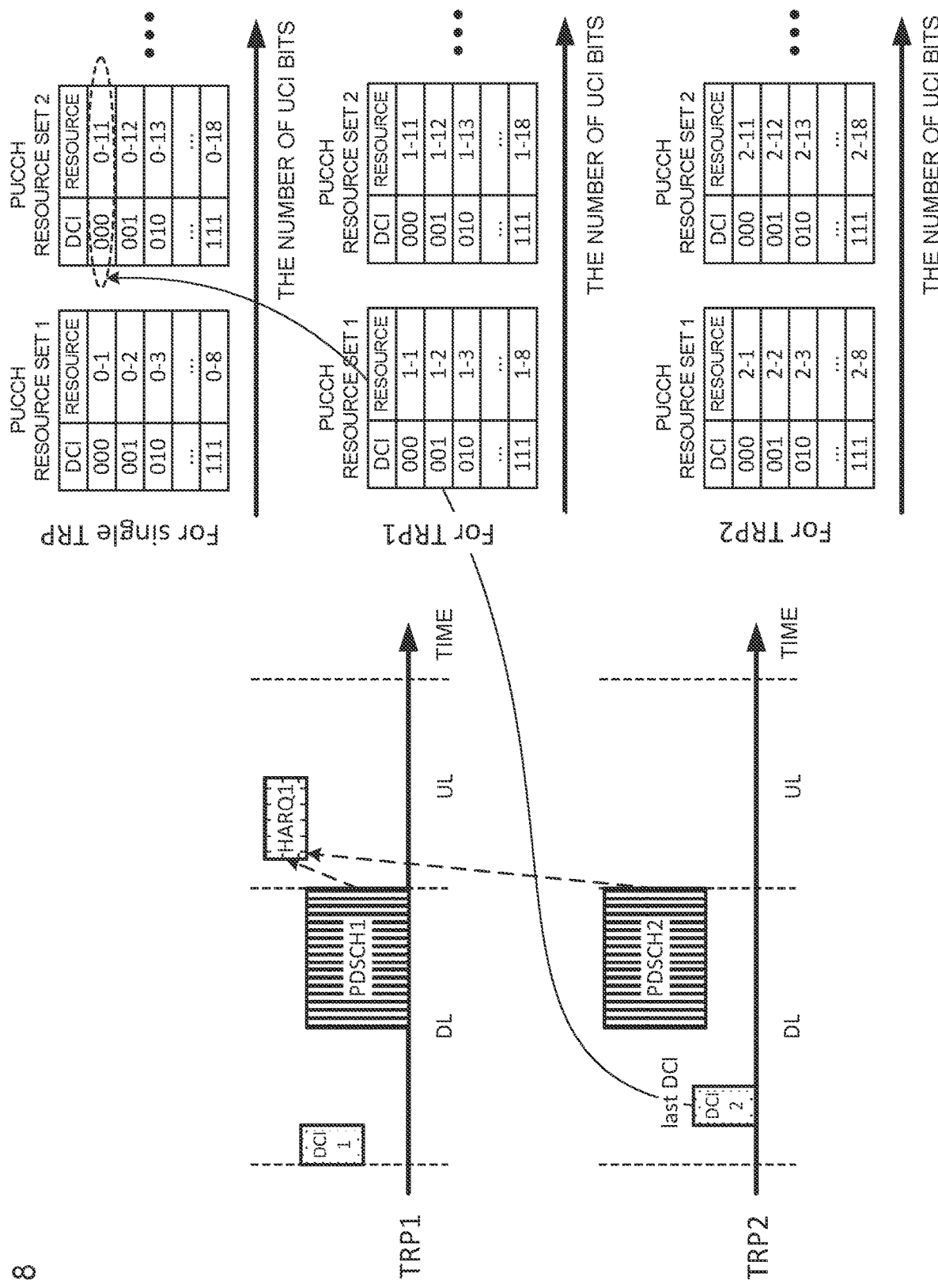
FIG. 8 is a diagram to show an example in which a plurality of groups of PUCCH resource sets are configured.

FIG. 8 is a diagram to show an example in which a plurality of groups of PUCCH resource sets are configured. This example is similar to that in FIG. 7, and thus, similar contents are not described repeatedly. In this example, a difference from FIG. 7 is that the UE is configured with not only the group of PUCCH resource sets for the TRP 1/2 but also a group of PUCCH resource sets common to the TRPs (which may be also referred to as PUCCH resource sets for single-TRP). The UE may transmit the HARQ 1 (and the HARQ 2) using the resource 0-11 based on a certain field of the DCI 2 (=000) and an upper right table in FIG. 7 (a table corresponding to the single-TRP).

On the other hand, the UE may determine the PUCCH resource transmitting the HARQ-ACK for a plurality of PDSCHs not subjected to the NCJT, based on the group of PUCCH resource sets not associated with the TRP.

Figure 9:
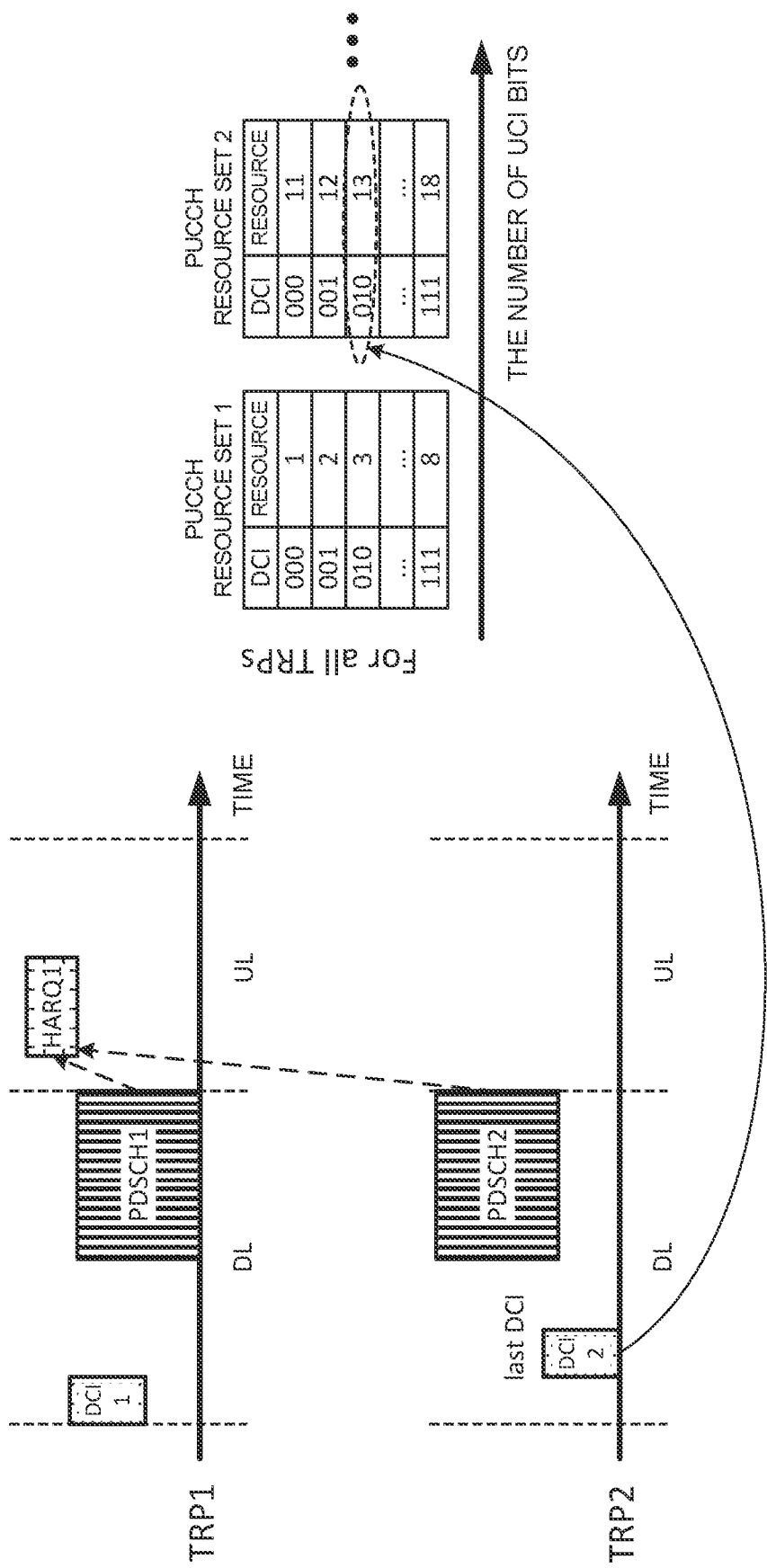
FIG. 9 is a diagram to show an example in which a group of PUCCH resource sets common to the TRPs is configured.

FIG. 9 is a diagram to show an example in which a group of PUCCH resource sets common to the TRPs is configured. This example is similar to that in FIG. 5, and thus, similar contents are not described repeatedly. In this example, the TCI states of the PDSCHs 1 and 2 are the same, and the UE may assume that these are transmitted substantially from the single-TRP.

In this case, the PUCCH resource may be determined by the same method as in Rel-15 NR described above (for example, by selecting the last DCI of the DCI 1 and DCI 2). In this example, the UE may select the DCI 2 as the DCI for determining the PUCCH resource, and transmit the HARQ 1 (and the HARQ 2) using the resource 13 based on a certain field of the DCI 2 (=010) and a right table in FIG. 9 (a table common to the TRPs).

[Spatial Relation Information]

The UE may be configured with spatial relation information (SRI) in units of PUCCH configuration (PUCCH-Config). The spatial relation information configured in the PUCCH configuration may be applied to the all PUCCH resources configured in the PUCCH configuration.

In a case that one PUCCH/PUSCH is transmitted for each slot, the UE may determine the SRI for each PUCCH/PUSCH similarly to Rel-15 NR. For example, in the case like in FIG. 3A, the UE may assume that the PUCCH transmitting the HARQ 1 in slot #m is QCLed with synchronization signal block (SSB) #0, the PUCCH transmitting the HARQ 2 in slot #m+1 is QCLed with SSB #10, and so on.

In consideration of a case that a plurality of PUCCHs/PUSCHs are transmitted for each slot, the UE may have the spatial relation information of a plurality of PUCCHs activated using one or more MAC control elements (MAC CE) (for example, PUCCH spatial relation activation/deactivation MAC CE).

The UE may assume that the activated PUCCH spatial relation information corresponds to the DMRS port groups in a descending or ascending manner. Specifically, the UE may assume that the activated PUCCH spatial relation information and the DMRS port groups are each sorted in descending or ascending order correspond on a one-to-one basis.

The UE may assume that an SRI ID of the active minimum PUCCH (a "PUCCH-SpatialRelationInfoId" of RRC) corresponds to a minimum DMRS port group ID. For example, in a case that two PUCCHs of the SRI ID=3 and 5 are activated, the UE may assume the QCL for the DMRS port group 1 based on the PUCCH of the SRI ID=3, and may assume the QCL for the DMRS port group 2 based on the PUCCH of the SRI ID=5.

Note that in a case that a condition of a dynamic fallback to the single-TRP (one TRP) is satisfied, the UE may assume a specific SRI ID (for example, the minimum active SRI ID, the maximum active SRI ID) for the QCL of the one TRP.

Here, in the present disclosure, the condition of the dynamic fallback to one TRP may correspond to, for example, the case that the UE is scheduled with a plurality of PDSCHs partially or completely overlapping for at least one of time and frequency domains by way of more than one piece of DCI, and at least one of the following conditions is satisfied.

Only one DMRS port group for the plurality of PDSCHs is indicated,

TCI states for the plurality of PDSCHs are the same, or the plurality of PDSCHs correspond to a specific QCL relation (for example, QCL-D).

The UE may be configured with an SRI group for each TRP. For example, the UE may be configured with a plurality of SRI groups through RRC signaling, and one piece of SRI per SRI group may be activated using the MAC CE. In this case, the MAC CE preferably includes at least one of information for identifying the SRI group (for example, SRI group ID) and information for identifying the TRP (for example, TRP ID).

As an example, the UE may be configured with an SRI group 1 for a DMRS port group 1, and one piece from the SRI (for example, {0, 1, . . . , 63}) included in the SRI group 1 may be activated using the MAC CE. The UE may be configured with an SRI group 2 for a DMRS port group 2, and one piece from the SRI (for example, {0, 1, . . . , 63}) included in the SRI group 2 may be activated using the MAC CE.

Note that in the case that the condition of the dynamic fallback to one TRP is satisfied, the UE may assume a specific SRI group (for example, an SRI group corresponding to the minimum SRI group ID, an SRI group corresponding to the maximum SRI group ID) for the QCL of the one TRP.

The UE may be configured with, in addition to the SRI group for each TRP, an SRI group common to the TRPs (which may be also referred to as a SRI group not associated with the TRP, a SRI group for single-TRP, or the like), or one piece of SRI (which may be also referred to as default SRI, fallback SRI, or the like).

Note that in the case that the condition of the dynamic fallback to one TRP is satisfied, the UE may assume the SRI group common to the TRPs or the default SRI for the QCL of the one TRP.

According to the first embodiment described above, the separate HARQ-ACK transmission can be appropriately controlled.

Note that in the first embodiment, the examples of the multi-PDCCH are shown in the drawings, but the single-PDCCH may be used. In this case, the PUCCH resource indicator field included in the single-PDCCH may be increased in the number of bits compared to the case of the multi-PDCCH. For example, if the PUCCH resource indicator field in the case of the multi-PDCCH has three bits, that of the single-PDCCH may be represented by three bits x the number of TRPs (for example, six bits). The UE may assume to indicate a PUCCH resource for a different TRP every three bits. This can specify the PUCCH resource for each TRP in each bit even in the case of the single-PDCCH.

Second Embodiment

A second embodiment relates to the joint HARQ-ACK transmission. Each HARQ-ACK included in the joint HARQ-ACK may correspond to a different PDSCH (codeword) and may be transmitted using at least one of the PUCCH and the PUSCH. The UE transmits the joint HARQ-ACK to one TRP.

A plurality of PDSCHs corresponding to the joint HARQ-ACK may be transmitted from the respective TRPs simultaneously, or at different timings. These PDSCHs may be scheduled by use of the single-PDCCH or the multi-PDCCH.

Figure 10:
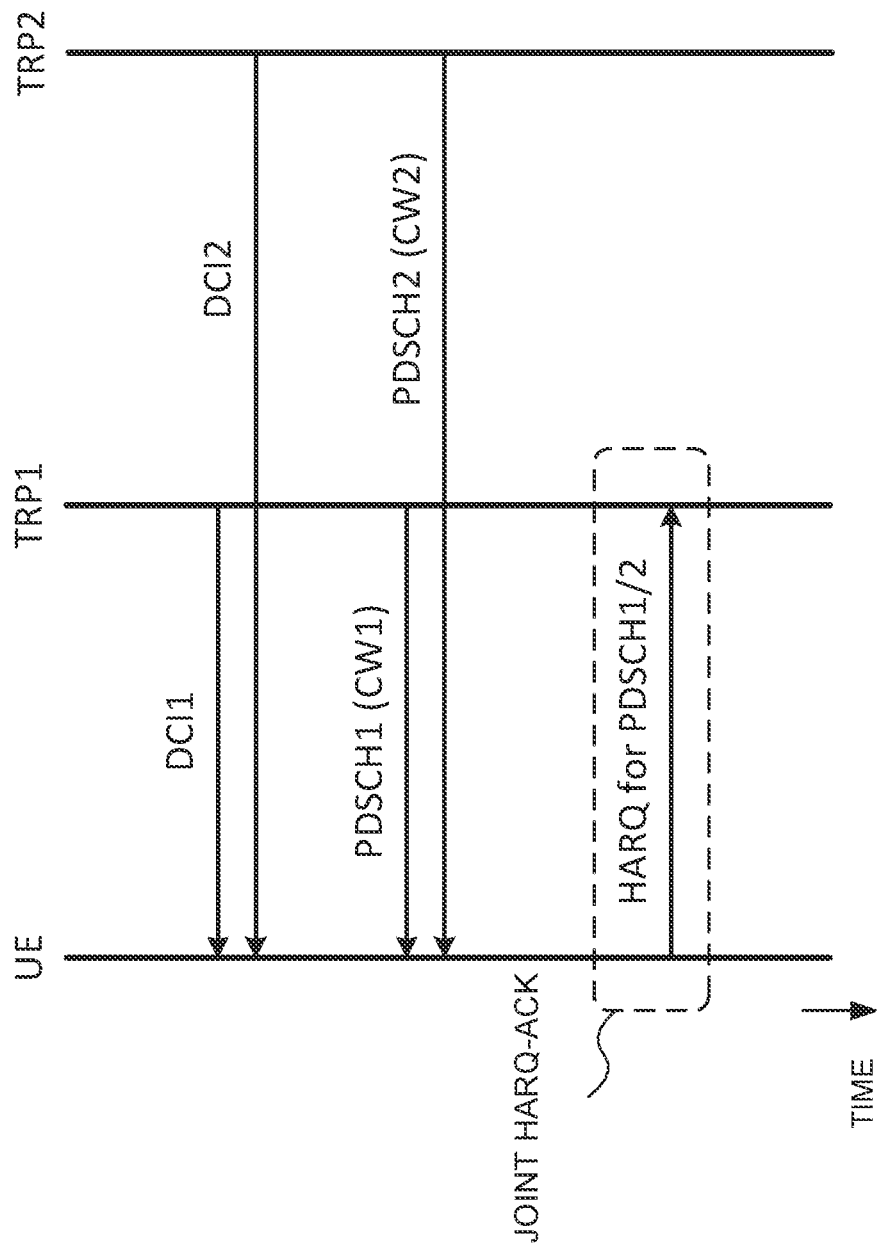
FIG. 10 is a diagram to show an example of a flow of a joint HARQ-ACK.

FIG. 10 is a diagram to show an example of a flow of the joint HARQ-ACK. In this example, the UE receives DCI 1 and DCI 2 each constituting the multi-PDCCH from the TRPs 1 and 2, respectively. The UE receives a PDSCH 1 (CW1) transmitted from TRP 1 based on the DCI 1, and a PDSCH 2 (CW2) transmitted from the TRP 2 based on the DCI 2.

The UE transmits an HARQ including the HARQ 1 for the PDSCH 1 and the HARQ 2 for the PDSCH 2 to the TRP 1. Note that a transmission destination of the HARQ may be the TRP 2.

The UE may assume that the TRP that is the transmission destination of the joint HARQ-ACK is a TRP corresponding to any or a combination of the following conditions:

A specific TRP (for example, TRP having the minimum TRP ID, TRP having the maximum TRP ID) among the TRPs from which a plurality of PDSCHs subjected to the NCJT or the DCI scheduling the plurality of PDSCHs subjected to the NCJT are transmitted, A TRP indicated by a piece of DCI, A TRP corresponding to a specific timing (for example, the earliest, the last) DCI among the DCI scheduling the plurality of PDSCHs subjected to the NCJT.

A TRP corresponding to the last DCI indexed and determined similarly to Rel-15 NR among the DCI scheduling the plurality of PDSCHs subjected to the NCJT.

The joint HARQ-ACK may be transmitted in one slot (that is, using one PUCCH/PUSCH for each slot).

Figure 11:
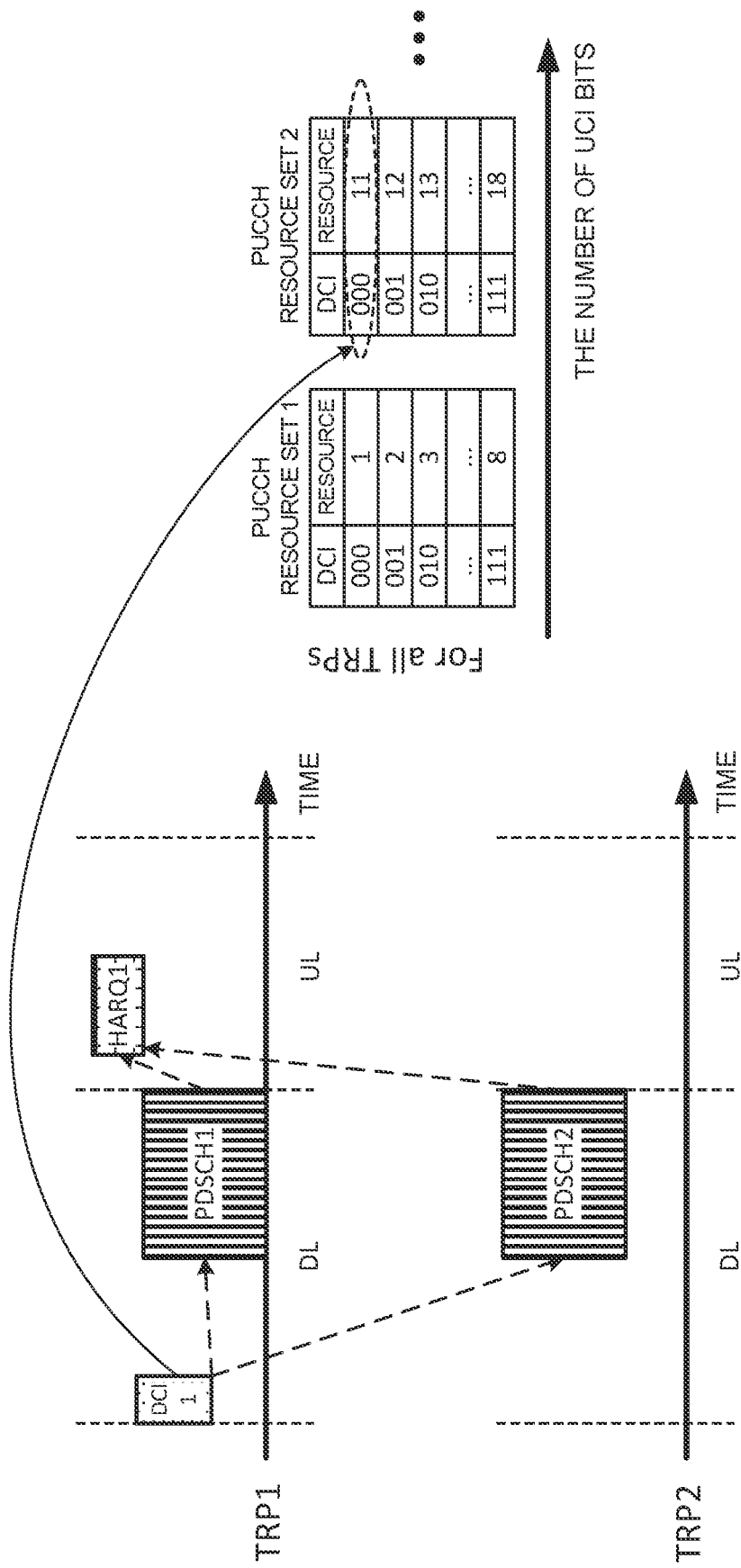
FIG. 11 is a diagram to show an example of a PUCCH resource for a joint HARQ-ACK for a single-PDCCH.

FIG. 11 is a diagram to show an example of a PUCCH resource for the joint HARQ-ACK for the single-PDCCH. This example is similar to that in FIG. 5, and thus, similar contents are not described repeatedly. In this example, a difference from FIG. 5 is that the DCI 2 is not present and the PDSCHs 1 and 2 are scheduled by way of the DCI 1.

In this case, the PUCCH resource may be determined by the same method as in Rel-15 NR described above. In this example, the UE may select the DCI 1 as the DCI for determining the PUCCH resource, and transmit the HARQ (the HARQ 1 and the HARQ 2) using the resource 13 based on a certain field of the DCI 1 (=000) and a right table in FIG. 11 (a table common to the TRPs).

Figure 12:
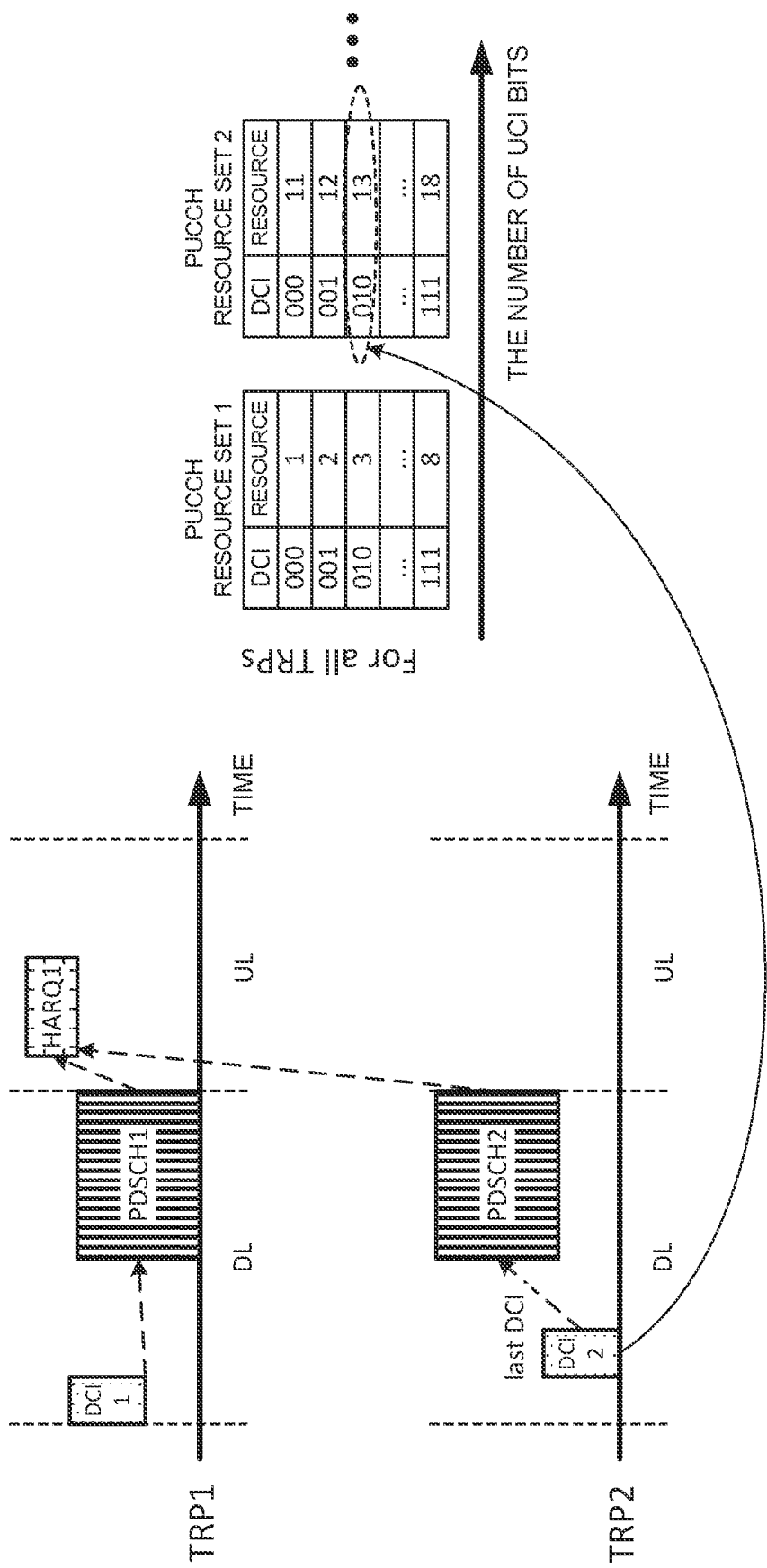
FIG. 12 is a diagram to show an example of a PUCCH resource for a joint HARQ-ACK for a multi-PDCCH.

FIG. 12 is a diagram to show an example of a PUCCH resource for the joint HARQ-ACK for the multi-PDCCH. This example is similar to that in FIG. 11, and thus, similar contents are not described repeatedly. In this example, a difference from FIG. 11 is that the DCI 2 is present, and the PDSCHs 1 and 2 are scheduled by way of the DCI 1 and the DCI 2, respectively.

In this example, the PUCCH resource may be determined by the same method as in Rel-15 NR described above (for example, by selecting the last DCI of the DCI 1 and DCI 2).

In this example, the UE may select the DCI 2 as the DCI for determining the PUCCH resource, and transmit the HARQ (the HARQ 1 and the HARQ 2) at the TRP 1 based on a certain field of the DCI 2 (=010) and a right table in FIG. 12 (a table common to the TRPs).

In the case of the multi-PDCCH, the PUCCH resource may be determined among the DCI received from the TRP having the smaller TRP ID, based on the DCI determined using the method in Rel. 15 NR described above. In a case that the backhaul delay between the TRPs is relatively large, the determination of the PUCCH resource for one TRP may be difficult to control using the DCI for the other TRP (for example, the ARI included in the DCI, a CCE index of the DCI, and the like). For this reason, the control is easy by determining the PUCCH resource for a specific TRP (for example, a TRP having the minimum TRP ID) always using the DCI for the specific TRP.

Figure 13:
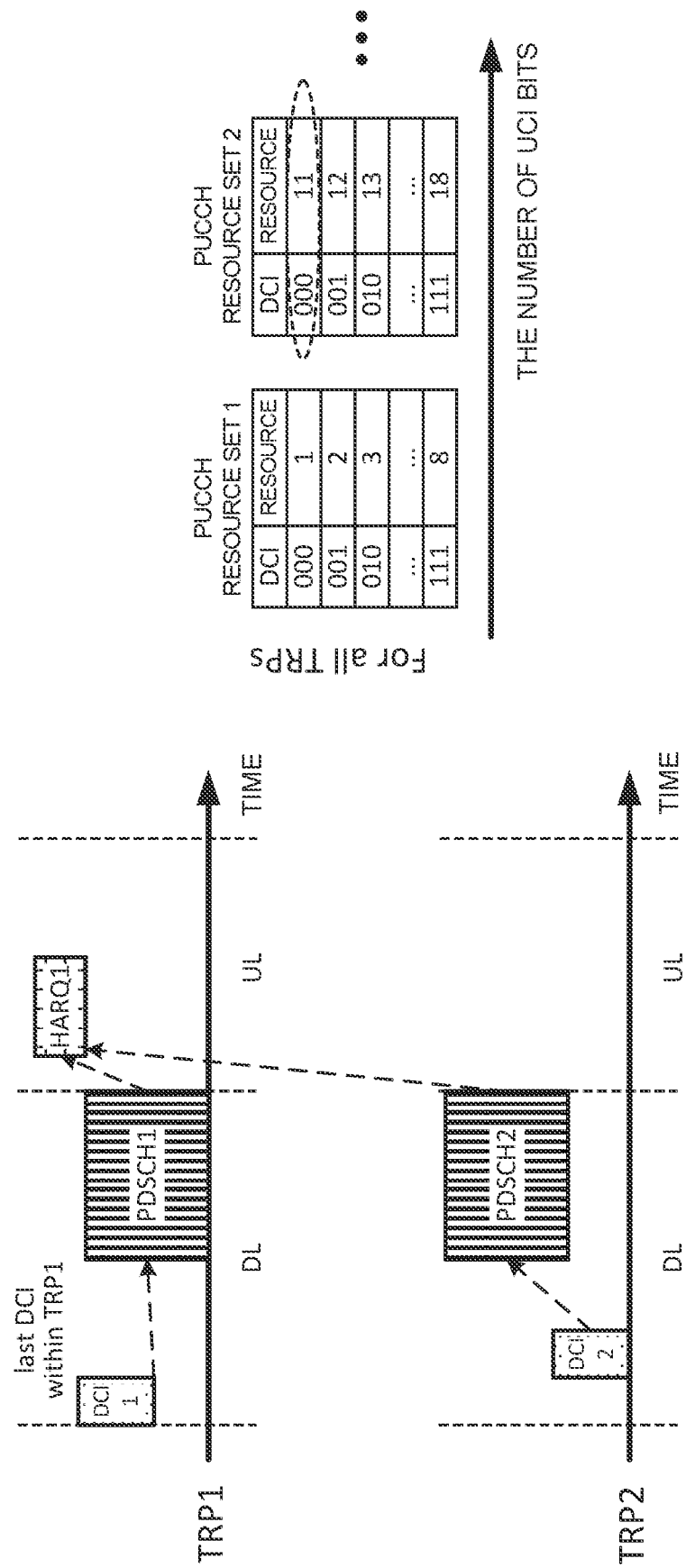
FIG. 13 is a diagram to show an example of a PUCCH resource for a joint HARQ-ACK for a multi-PDCCH.

FIG. 13 is a diagram to show an example of a PUCCH resource for the joint HARQ-ACK for the multi-PDCCH. This example is similar to that in FIG. 12, and thus, similar contents are not described repeatedly. In this example, a difference from FIG. 12 is that not the DCI 2 but the DCI 1 that is the last DCI among the DCI for the TRP 1 is used to determine the PUCCH resource for the TRP 1.

In this example, the UE may select the DCI 1 as the DCI for determining the PUCCH resource, and transmit the HARQ (the HARQ 1 and the HARQ 2) at the TRP 1 corresponding to the minimum TRP ID based on a certain field of the DCI 2 (=000) and a right table in FIG. 13 (a table common to the TRPs).

According to the second embodiment described above, the joint HARQ-ACK transmission can be appropriately controlled.

Third Embodiment

The UE may transmit the HARQ-ACK for each TRP in an independent (or different) HARQ-ACK codebook (hereinafter, also referred to as an HARQ codebook). In this case, the HARQ-ACK feedback can be performed with a low overhead.

On the other hand, in order to prevent the number of bits of the HARQ-ACK from not matching between the NW and the UE when one DCI among the multi-PDCCH is missed, the HARQ-ACK for each TRP is preferably transmitted using a common HARQ codebook. Next, in a third embodiment, the common HARQ codebook will be described.

<Semi-Static HARQ Codebook>

First, an example of a semi-static HARQ codebook (which may be also referred to as a Type-1 HARQ-ACK codebook) will be described. FIGS. 14A and 14B are diagrams to show examples of the semi-static HARQ codebook. This example corresponds to a case that the UE should feedback an HARQ-ACK of a first bit number (for example, two bits) to a first TRP (TRP 1), and an HARQ-ACK of a second bit number (for example, two bits) to a second TRP (TRP 1).

As shown in FIG. 14A, in the case of the joint HARQ-ACK transmission, the UE may transmit an HARQ-ACK of the first bit number+the second bit number (for example, 2+2=4 bits) to the TRP 1 or the TRP 2.

As shown in FIG. 14B, in the case of the separate HARQ-ACK transmission, the UE may transmit a first HARQ-ACK of the first bit number+the second bit number (for example, 2+2=4 bits) to the TRP 1, and a second HARQ-ACK of the same content as the first HARQ-ACK to the TRP 2.

<Dynamic HARQ Codebook>

Next, an example of a dynamic HARQ codebook (which may be also referred to as a Type-2 HARQ-ACK codebook) will be described. One or more pieces of DCI scheduling each PDSCH of the multi-PDSCH may include a DL assignment index (Downlink Assignment Index (Indicator) (DAI)) in a TRP direction. The DAI may be referred to as a DL DAI (Downlink DAI). Here, the DAI may include at least one of a counter DA and a total DAI.

The counter DAI may indicate a counter value of downlink transmissions scheduled within a certain period (for example, at least one of PDSCH, data, transport block). For example, the counter DAI in the DCI scheduling the PDSCH within the certain period may indicate a number counted at least in a TRP area (for example, in order of TRP ID) within the certain period.

The total DAI may indicate a sum (the total number) of downlink transmissions scheduled within a certain period. For example, the total DAI in the DCI scheduling the PDSCH in a certain time unit within the certain period (for example, PDCCH monitoring occasion) may indicate the total number of PDSCHs from the all TRPs scheduled until the certain time unit (which may be also referred to as a point, a timing, and the like) within the certain period.

Here, in the present disclosure, the certain period for the DAI described above may be one or more symbols, 1 or more slots, and the like. In the present disclosure, the downlink transmissions scheduled within a certain period may be interchangeably interpreted with the multi-PDSCH.

In a case that some of a plurality of pieces of DCI transmitted from a plurality of TRPs are missed (are failed to be received), the UE can recognize that some of the plurality of pieces of DCI is failed to be received.

In a case that the DCI scheduling each PDSCH of the multi-PDSCH includes at least one of the counter DAI and the total DAI, the UE may assume that the TRPs transmitting the multi-PDSCH are in tight cooperation with each other, or are connected using the non ideal backhaul. This is because one of the TRPs preferably grasps the DCI for the other of the TRPs to issue the DAI in the TRP direction.

The UE may transmit a UL DAI (Uplink DAI) to the network in association with the PUCCH or the PUSCH transmitting the joint or separate HARQ-ACK. The UL DAI may be transmitted in a case that the DL DAI described above is not received or received.

Here, the UL DAI may be information about the number of pieces of the DCI that are detected by the UE, and that schedule the downlink transmissions within a certain period (for example, the number of detections of the DCI). That information may be a value of this number of pieces of the DCI, or information about whether or not the number of pieces of the DCI matches the value of the total DAI notified from the network (which may be represented by 1-bit information).

Here, the value of the total DAI may be notified to the UE through higher layer signaling, physical layer signaling (for example, DCI scheduling at least one of the multi-PDSCH within the certain period), or a combination of these.

The UL DAI described above may be explicitly or implicitly transmitted using at least one of the following items:
(1) Some of UCI bits of the PUCCH/PUSCH,
(2) At least a part of a modulation signal of the DMRS for the PUCCH/PUSCH,
(3) A sequence used to transmit at least a part or all of the DMRS for the PUCCH/PUSCH,
(4) A resource used to transmit at least a part or all of the DMRS for the UCI for the PUCCH/PUSCH (for example, physical resource).

For example, in a case of (1) described above, the UE may transmit a bit corresponding to the UL DAI (for example, one bit) included in the PUCCH/PUSCH transmitting the joint or separate HARQ-ACK.

In a case of (2) described above, the UE may transmit a bit corresponding to the UL DAI (for example, one bit) modulated (for example, Binary Phase Shift Keying (BPSK) modulation, Quadrature Phase Shift Keying (QPSK) modulation) in at least a part of a DMRS resource for the PUCCH/PUSCH transmitting the joint or separate HARQ-ACK (for example, resource element (RE)) and a physical resource block (PRB).

In a case of (3) described above, the UE may transmit a first sequence on a DMRS resource for the PUCCH/PUSCH transmitting the joint or separate HARQ-ACK to implicitly transmit a UL DAI of a first value, or may transmit a second sequence different from the first sequence to implicitly transmit a UL DAI of a second value.

Here, the second sequence may be a sequence generated by calculating (for example, addition, subtraction, multiplication, division) a certain offset with respect to at least one of a cyclic shift (CS), a sequence index, and an orthogonal code (Orthogonal Cover Code (OCC)) of the first sequence. The second sequence may be a DMRS sequence generated by adding +6 to the CS index of the first sequence.

In a case of (4) described above, the UE may use a resource indicated from the network as a resource for the PUCCH/PUSCH transmitting the joint or separate HARQ-ACK to implicitly transmit the UL DAI of the first value, or may use a resource offset by a certain offset from the indicated resource to implicitly transmit the UL DAI of the second value.

The certain offset in (3) and (4) described above or the like may be notified to the UE through higher layer signaling, physical layer signaling (for example, DCI scheduling at least one of the multi-PDSCH within the certain period), or a combination of these.

According to the third embodiment described above, recognition of the number of bits of the HARQ-ACK for the multi-PDSCH can be preferably matched between the network and the UE even in a case that a part of the DCI scheduling the multi-PDSCH is not received by the UE.

Other Embodiments

The HARQ-ACK transmission type the UE applies to the multi-PDSCH (whether to perform the separate HARQ-ACK transmission or the joint HARQ-ACK transmission) may be determined based on at least one of the following:
  Configuration through higher layer signaling (for example, the UE may assume that the separate HARQ-ACK transmission is to be used in a case that the joint HARQ-ACK transmission is not configured),
  Dynamic specification by way of the DCI (for example, the type of the HARQ-ACK transmission to be used may be specified using a new bit field or an existing bit field),
  Determination by a plurality of PUCCH resources for HARQ-ACK for the multi-PDSCH (for example, it may be determined that the separate HARQ-ACK transmission is performed in a case that these PUCCH resources do not overlap in the timer/frequency domain, and otherwise the joint HARQ-ACK transmission is performed (that is, in a case of partially or completely overlapping)).

Figure 15A:
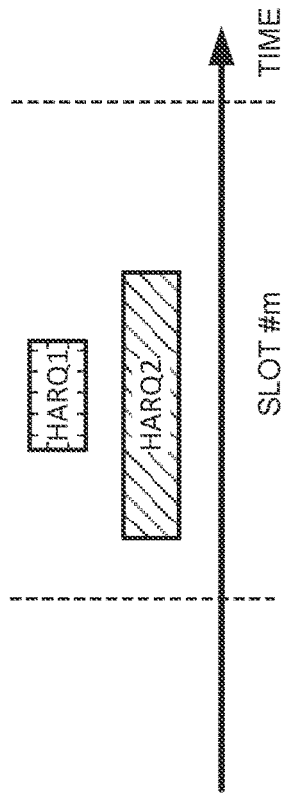
FIGS. 15A to 15D are diagrams to show examples of determination of an HARQ-ACK transmission type based on a PUCCH resource.
Figure 15B:
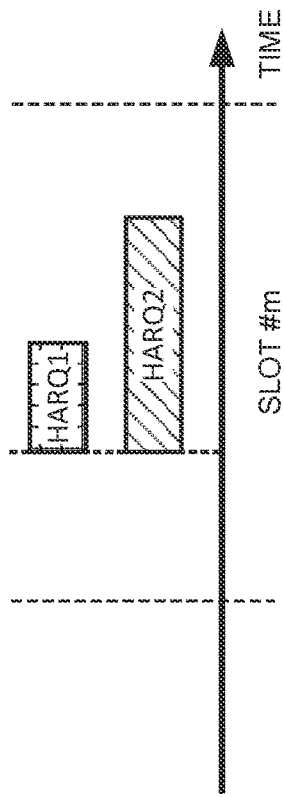
Figure 15C:
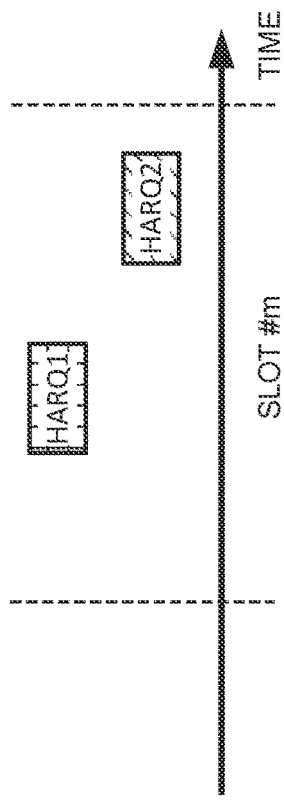
Figure 15D:
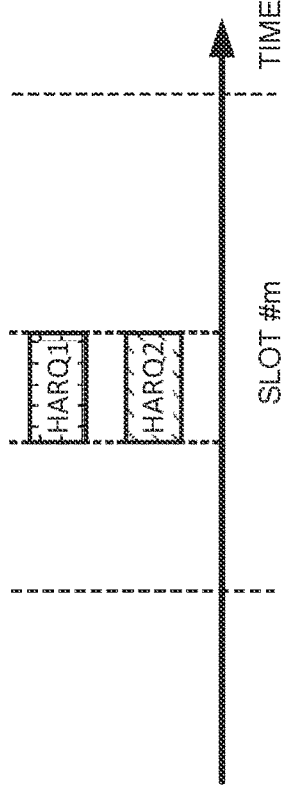

FIGS. 15A to 15D are diagrams to show examples of determination of the HARQ-ACK transmission type based on the PUCCH resource. FIGS. 15A and 15B show examples in which the separate HARQ-ACK transmission is determined to be used, and FIGS. 15C and 15D show examples in which the joint HARQ-ACK transmission is determined to be used.

In FIG. 15A, time resources for the HARQ 1 and the HARQ 2 do not overlap at all. In this case, the UE may transmit each separate HARQ-ACK on the resource for each HARQ.

In FIG. 15B, time resources for the HARQ 1 and the HARQ 2 overlap (the HARQ 1 is completely included in the time resource for the HARQ 2). The UE may transmit each separate HARQ-ACK on the resource for each HARQ in a case that a PUCCH-PUCCH simultaneous transmission is possible, and otherwise, may transmit the separate HARQ-ACK using one resource (for example, the larger resource for the HARQ 2) and drop the other resource (for example, the resource for the HARQ 1).

In FIG. 15C, time resources for the HARQ 1 and the HARQ 2 are completely the same. In this case, the UE may transmit the joint HARQ-ACK on any of the resources for the HARQ.

In FIG. 15D, start symbols of time resources for the HARQ 1 and the HARQ 2 are aligned. In this case, the UE may transmit the joint HARQ-ACK on any of the resources for the HARQ.

The present disclosure mainly describes the example in which the UCI (HARQ-ACK) is transmitted using the PUCCH, but the present disclosure is not limited to this. The content of the present disclosure can be applied to a case that the UCI is transmitted using the PUSCH (UCI on PUSCH). The PUSCH may be a PUSCH scheduled by way of the DCI, or a configured grant PUSCH. The PUCCH spatial relation information can be interpreted as spatial relation information of a measurement reference signal (Sounding Reference Signal (SRS)) for the PUSCH.

In the multi-PUCCH in the present disclosure, it may be assumed that any or a combination of time division multiplexing (TDM)), frequency division multiplexing (FDM)), and space division multiplexing (SDM)) is applied.

The HARQ-ACK in the present disclosure may be interpreted as any piece of UCI. In this case, the PUCCH resource may be configured through RRC signaling. For example, the UE may use the resource configured through RRC as a PUCCH resource for CSI reporting.

Note that in the present disclosure, which TRP the DCI schedules may be explicitly specified in a DCI bit field. In a case that at least one of the CORESET, the search space set, the QCL, the TCI state, and the like which correspond to the TRP is configured in advance, the UE may determine which TRP the DCI schedules based on at least one of the CORESET, the search space set, the QCL, and the TCI state that the DCI is detected.

Note that in a plurality of drawings such as FIG. 4, the examples in which a plurality of pieces of DCI (DCI 1, and DCI 2) are detected in different symbols are shown, but the plurality of pieces of DCI may be detected in the same symbol. In a case that the UE has (or reports support of) a UE capability capable of detecting a plurality of pieces of DCI different in the QCL in the same symbol, the UE may detect the plurality of pieces of DCI in the same symbol.
(Radio Communication System)

Hereinafter, a structure of a radio communication system according to one embodiment of the present disclosure will be described. In this radio communication system, the radio communication method according to each embodiment of the present disclosure described above may be used alone or may be used in combination to perform communication.

Figure 16:
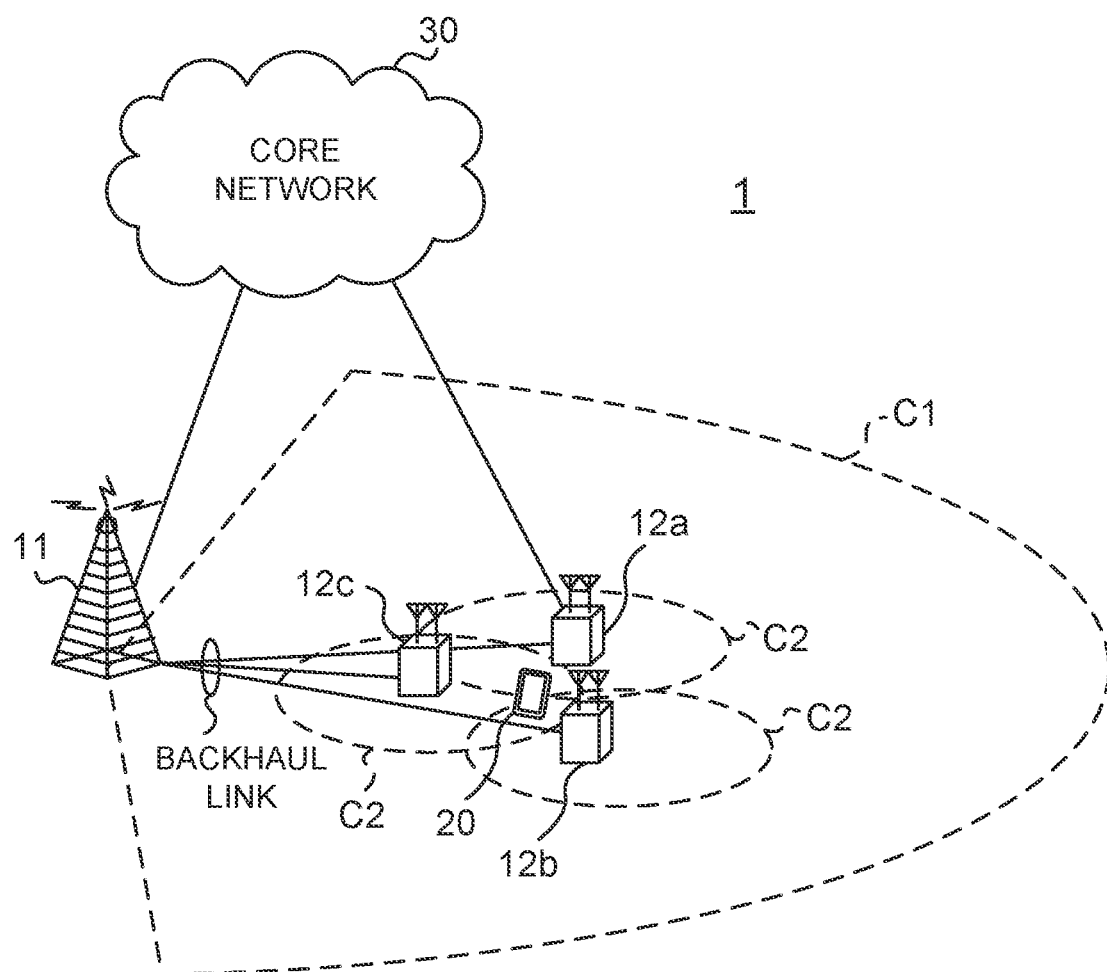
FIG. 16 is a diagram to show an example of a schematic structure of a radio communication system according to one embodiment.

FIG. 16 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. A user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation (CA) and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information may be communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a certain search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on may be communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

Figure 17:
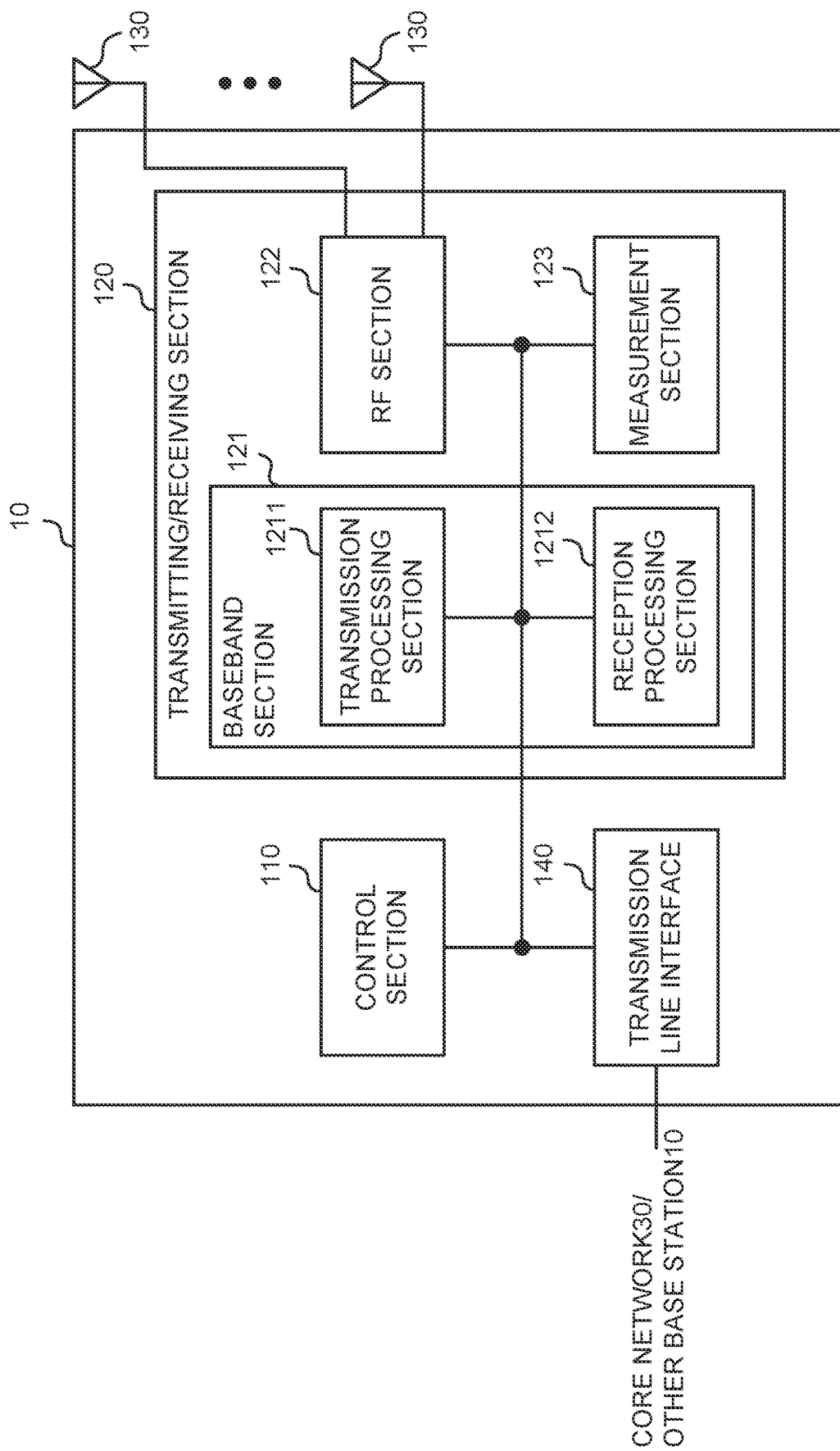
FIG. 17 is a diagram to show an example of a structure of a base station according to one embodiment.

(Base Station) FIG. 17 is a diagram to show an example of a structure of the base station according to one embodiment. The base station 10 includes a control section 110, a transmitting/receiving section 120, transmitting/receiving antennas 130 and a communication path interface 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam forming (for example, precoding), analog beam forming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RPM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving sections 120 may transmit a PDSCH to the user terminal 20. The control section 110 may control such that the PDSCH overlaps a PDSCH transmitted from another base station 10 in at least one of the time and frequency resources.

(User Terminal)

Figure 18:
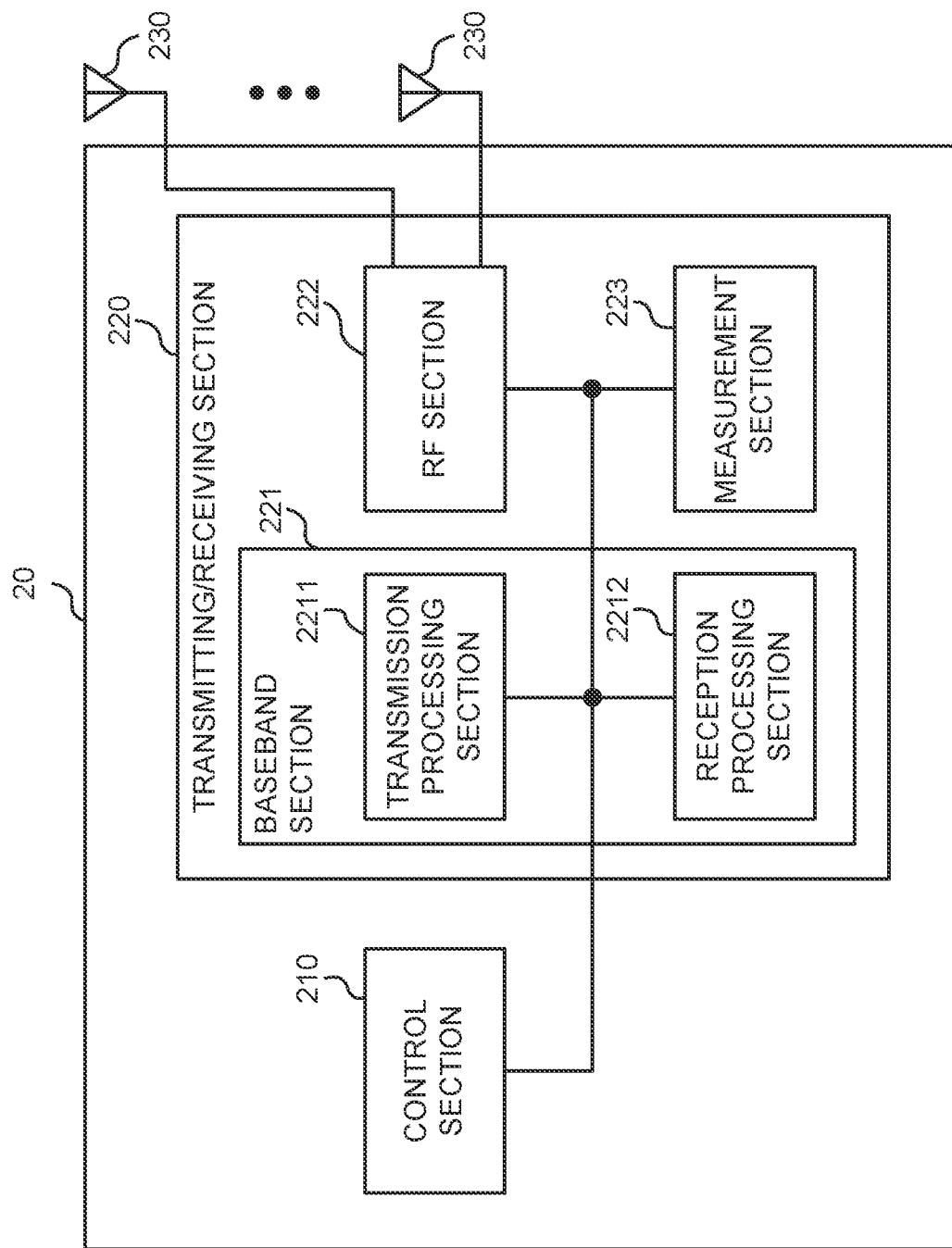
FIG. 18 is a diagram to show an example of a structure of a user terminal according to one embodiment.

FIG. 18 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam forming (for example, precoding), analog beam forming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a certain channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220 and the transmitting/receiving antennas 230.

Note that the transmitting/receiving section 220 may receive a first PDSCH (Physical Downlink Shared Channel) from a first transmission/reception point (TRP), and a second PDSCH from a second TRP, the second PDSCH overlapping the first PDSCH in at least one of the time and frequency resources. In other words, the transmitting/receiving section 220 may receive the multi-PDSCH.

The control section 210 may perform control for transmitting a first Hybrid Automatic Repeat reQuest ACKnowledgement (HARQ-ACK) for the first PDSCH to the first TRP, and transmitting a second HARQ-ACK for the second PDSCH to the second TRP.

The control section 210 may determine a resource transmitting the first HARQ-ACK based on a group of resource sets for the first TRP, and may determine a resource transmitting the second HARQ-ACK based on a group of resource sets for the second TRP.

The control section 210 may determine both the resource transmitting the first HARQ-ACK and the resource transmitting the second HARQ-ACK, based on a group of common resource sets.

In a case that a Physical Uplink Control Channel (PUCCH) spatial relation information having a first ID and a PUCCH spatial relation information having a second ID of a value larger than the first ID are activated, the control section 210 may perform control for transmitting the first HARQ-ACK based on the PUCCH spatial relation information having the first ID if an ID of the second TRP is larger than an ID of the first TRP, and transmitting the first HARQ-ACK based on the PUCCH spatial relation information having the second ID if the ID of the second TRP is equal to or smaller than the ID of the first TRP.

The control section 210 may assume that spatial relation information for the first TRP and spatial relation information for the second TRP are separately activated (for example, in a case that an SRI group for each TRP is configured).

The control section 210 may perform control for transmitting both the first HARQ-ACK for the first PDSCH and the second HARQ-ACK for the second PDSCH to one (for example, only one) of the first TRP and the second TRP.

The control section 210 may determine that a TRP transmitting the first HARQ-ACK and the second HARQ-ACK is a TRP having the smaller ID among the first TRP and the second TRP.

The control section 210 may perform control for using a common codebook to transmit the first HARQ-ACK for the first PDSCH and the second HARQ-ACK for the second PDSCH.

One or more pieces of downlink control information scheduling the first PDSCH and the second PDSCH may include a DL assignment index (Downlink Assignment Index (Indicator) (DAI)) in a TRP direction. The control section 210 of may determine whether or not a part of the one or more pieces of downlink control information transmitted from the first TRP and the second TRP can be received (or whether or not the all is successfully received) based on the DAI in the TRP direction.

The control section 210 may perform control for implicitly or explicitly transmitting an uplink DL assignment index (Uplink Downlink Assignment Index (UL DAI)) together with the transmission of the first HARQ-ACK and the second HARQ-ACK, where the UL DAI may correspond to information about the number of detections of the downlink control information (DCI) scheduling a PDSCH within a certain period.

The control section 210 may generate at least a part of a certain DMRS (for example, a DMRS for the PUCCH or the PUSCH), or may determine at least one of a sequence, a resource and the like of the DMRS, based on the UL DAI.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using this plurality of pieces of apparatus. The functional blocks may be implemented by combining software into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 19:
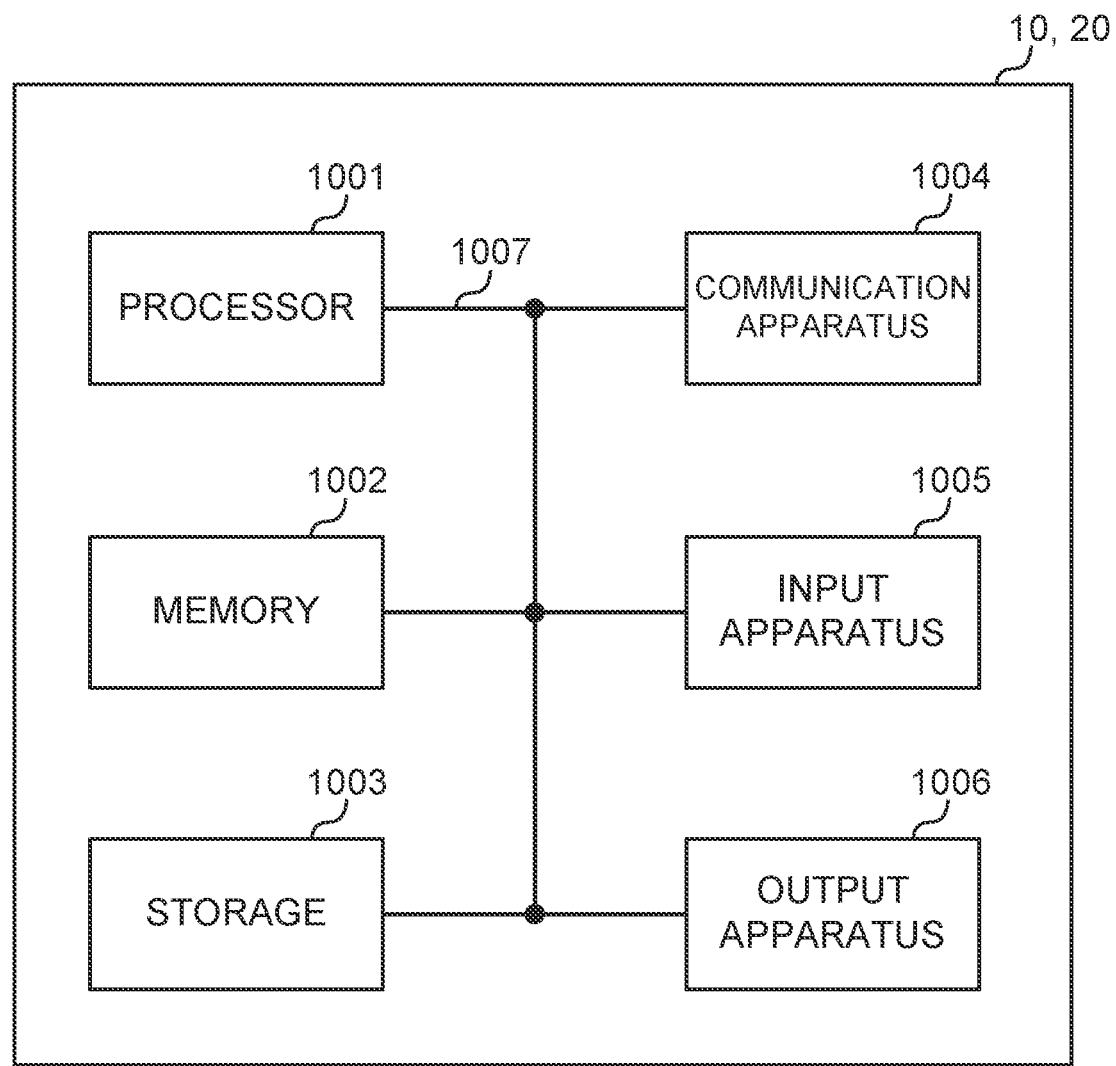
FIG. 19 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 19 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 Ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for certain numerology in a certain carrier. Here, a common RB may be specified by an index of the RB based on the common reference point of the carrier. A PRB may be defined by a certain BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a certain signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure can be used interchangeably. The "network" may mean an apparatus (for example, a base station) included in the network.

In the present disclosure, the terms such as "precoding," a "precoder," a "weight (precoding wait)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier,"

and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives a single medium access control control element (MAC CE) to activate first spatial relation information for a first transmission and reception point (TRP) and to activate second spatial relation information for a second TRP; and
a processor that applies the first spatial relation information to a first physical uplink control channel (PUCCH) to be transmitted to the first TRP, and applies the second spatial relation information to a second PUCCH to be transmitted to the second TRP,
wherein the processor:
if the terminal is provided with a Radio Resource Control (RRC) signaling, controls to transmit the first PUCCH and the second PUCCH in a single slot, and
if the terminal is not provided with the RRC signaling, controls to transmit the first PUCCH and the second PUCCH each in different slots, and
wherein a first Hybrid Automatic Repeat reQuest ACKnowledgement (HARQ-ACK) transmitted to the first TRP and a second HARQ-ACK transmitted to the second TRP have a same content.

2. The terminal according to claim 1, further comprising a transmitter that transmits the HARQ-ACK for a first physical downlink shared channel (PDSCH) from the first TRP and a second PDSCH from the second TRP using the first PUCCH and the second PUCCH.

3. A radio communication method for a terminal, comprising:
receiving a single medium access control control element (MAC CE) to activate first spatial relation information for a first transmission and reception point (TRP) and to activate second spatial relation information for a second TRP;
applying the first spatial relation information to a first physical uplink control channel (PUCCH) to be transmitted to the first TRP, and applying the second spatial relation information to a second PUCCH to be transmitted to the second TRP;
if the terminal is provided with a Radio Resource Control (RRC) signaling, controlling to transmit the first PUCCH and the second PUCCH in a single slot; and
if the terminal is not provided with the RRC signaling, controlling to transmit the first PUCCH and the second PUCCH each in different slots,
wherein a first Hybrid Automatic Repeat reQuest ACKnowledgement (HARQ-ACK) transmitted to the first TRP and a second HARQ-ACK transmitted to the second TRP have a same content.

4. A base station comprising:
a transmitter that transmits a single medium access control control element (MAC CE) to activate first spatial relation information for a first transmission and reception point (TRP) and to activate second spatial relation information for a second TRP; and
a processor that determines that the first spatial relation information is applied to a first physical uplink control channel (PUCCH) to be transmitted to the first TRP and the second spatial relation information is applied to a second PUCCH to be transmitted to the second TRP,
wherein the processor:
if the base station provides a terminal with a Radio Resource Control (RRC) signaling, controls to receive the first PUCCH and the second PUCCH in a single slot, and
if the base station does not provide the terminal with the RRC signaling, controls to receive the first PUCCH and the second PUCCH each in different slots, and
wherein a first Hybrid Automatic Repeat reQuest ACKnowledgement (HARQ-ACK) transmitted to the first TRP and a second HARQ-ACK transmitted to the second TRP have a same content.

5. A system comprising a terminal and a base station, wherein
the terminal comprises:
a receiver that receives a single medium access control control element (MAC CE) to activate first spatial relation information for a first transmission and reception point (TRP) and to activate second spatial relation information for a second TRP; and
a processor that applies the first spatial relation information to a first physical uplink control channel (PUCCH) to be transmitted to the first TRP, and applies the second spatial relation information to a second PUCCH to be transmitted to the second TRP,
wherein the processor:
if the terminal is provided with a Radio Resource Control (RRC) signaling, controls to transmit the first PUCCH and the second PUCCH in a single slot, and if the terminal is not provided with the RRC signaling, controls to transmit the first PUCCH and the second PUCCH each in different slots, and wherein a first Hybrid Automatic Repeat reQuest ACKnowledgement (HARQ-ACK) transmitted to the first TRP and a second HARQ-ACK transmitted to the second TRP have a same content, and the base station comprises:

a transmitter that transmits the MAC CE.

* * * * *